US011846328B2

(12) United States Patent
Sugiura et al.

(10) Patent No.: US 11,846,328 B2
(45) Date of Patent: Dec. 19, 2023

(54) FRICTION ENGAGEMENT DEVICE

(71) Applicants: AISIN CORPORATION, Aichi (JP); TOYOTA JIDOSHA KABUSHIKI KAISHA, Toyota (JP)

(72) Inventors: Hikaru Sugiura, Kariya (JP); Keita Inda, Kariya (JP); Tatsuya Okishima, Kariya (JP); Toshihiko Kamiya, Toyota (JP); Masashi Ikemura, Toyota (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 17/417,646

(22) PCT Filed: Jan. 27, 2020

(86) PCT No.: PCT/JP2020/002732
§ 371 (c)(1),
(2) Date: Mar. 11, 2022

(87) PCT Pub. No.: WO2020/158654
PCT Pub. Date: Aug. 6, 2020

(65) Prior Publication Data
US 2022/0205493 A1    Jun. 30, 2022

(30) Foreign Application Priority Data
Feb. 1, 2019   (JP) .................. 2019-016993

(51) Int. Cl.
*F16D 25/0638*    (2006.01)
*B60K 6/387*    (2007.10)
(Continued)

(52) U.S. Cl.
CPC .......... *F16D 25/0638* (2013.01); *B60K 6/387* (2013.01); *F16D 25/12* (2013.01);
(Continued)

(58) Field of Classification Search
CPC ...... F16D 13/52; F16D 13/70; F16D 25/0638; F16D 25/123; F16D 2300/10
See application file for complete search history.

(56) References Cited

U.S. PATENT DOCUMENTS 5,960,923 A * 10/1999 Araki .................. F16D 25/0638
                                                    192/109 A
8,397,889 B2 * 3/2013 Gold ..................... F16D 13/683
                                                    192/70
(Continued)

FOREIGN PATENT DOCUMENTS

JP         4271332 B2 *  6/2009
JP      2011-213190 A    10/2011

OTHER PUBLICATIONS

Mar. 31, 2020 Written Opinion issued in International Patent Application No. PCT/JP2020/002732.
(Continued)

*Primary Examiner* — Stacey A Fluhart
(74) *Attorney, Agent, or Firm* — Oliff PLC

(57) ABSTRACT

A friction engagement device includes an elastic member between a piston and a friction plate in an axial direction. Elastic member includes: second engaged portion to be brought into engagement with engagement portion of tubular member so as to be movable in axial direction; and annular plate portion sandwiched between pressing surface of piston and friction plate from both sides in axial direction. Surface of annular plate portion facing first axial side is provided with projection and recess arranged alternately in circumferential direction. Assuming that a phase where radial groove provided in pressing surface and projection provided on annular plate portion are located at corresponding positions in circumferential direction is a particular phase, engagement portion of tubular member, first engaged portion of piston, and second engaged portion of elastic
(Continued)

member are formed such that piston and elastic member are unable to come into engagement with tubular member at particular phase.

15 Claims, 8 Drawing Sheets

(51) Int. Cl.
*F16D 25/12* (2006.01)
*B60K 6/48* (2007.10)
*F16D 121/04* (2012.01)
*F16D 127/02* (2012.01)

(52) U.S. Cl.
CPC ... *B60K 2006/4825* (2013.01); *B60Y 2200/92* (2013.01); *F16D 2121/04* (2013.01); *F16D 2127/02* (2013.01); *F16D 2300/06* (2013.01)

(56) References Cited

U.S. PATENT DOCUMENTS

| | | | |
|---|---|---|---|
| 2001/0017432 A1* | 8/2001 | Tane | F16D 13/64 |
| | | | 264/320 |
| 2006/0201772 A1* | 9/2006 | Kinpara | F16D 13/52 |
| | | | 192/85.34 |
| 2014/0158494 A1* | 6/2014 | Kremer | F16D 25/063 |
| | | | 192/70.14 |
| 2018/0031050 A1* | 2/2018 | Deneszczuk | F16D 13/70 |
| 2019/0329641 A1* | 10/2019 | Persinger | F16D 13/52 |
| 2020/0023725 A1* | 1/2020 | Hoess | B60K 6/48 |
| 2020/0400201 A1* | 12/2020 | Oezkan | F16D 13/75 |

OTHER PUBLICATIONS

Mar. 31, 2020 International Search Report issued in International Patent Application No. PCT/JP2020/002732.

* cited by examiner

FRICTION ENGAGEMENT DEVICE

TECHNICAL FIELD

The present disclosure relates to friction engagement devices.

BACKGROUND ART

An example of a friction engagement device is disclosed in Japanese Unexamined Patent Application Publication No. 2011-213190 (JP 2011-213190 A), which will be referred to as "Patent Document 1". Reference signs within parentheses in the following description of BACKGROUND ART correspond to those used in Patent Document 1. Patent Document 1 discloses a technique for efficiently cooling friction plates (31) in a clutch (CL) functioning as a wet friction engagement device. Specifically, the friction plates (31) are disposed in a circulating oil chamber (38) defined inside a clutch housing (CH), so that the clutch (CL) enables cooling of the friction plates (31) with a relatively large amount of oil circulating through the circulating oil chamber (38). A pressing surface (36a) of a piston (36) for pressing the friction plates (31) is provided with radial grooves (36c) each extending in a radial direction. Thus, the clutch (CL) would be able to allow oil to flow radially outward through the radial grooves (36c) if the clutch (CL) is in a completely engaged state where clearances between the friction plates (31) adjacent to each other are removed.

RELATED ART DOCUMENTS

Patent Documents

Patent Document 1: JP 2011-213190 A

SUMMARY OF THE DISCLOSURE

Problem to be Solved by the Disclosure

As described above, Patent Document 1 discloses the friction engagement device in which the pressing surface of the piston is provided with the radial grooves. The use of such a piston would allow oil supplied from a region radially inward of the friction plates to flow radially outward through the radial grooves if the piston is in a pressing state where the piston is pressing the friction plates. Depending on usage of the friction engagement device, however, an engagement shock resulting from engagement of the friction engagement device may be great. Unfortunately, Patent Document 1 makes no mention of such an engagement shock.

Accordingly, what is desired is to develop a technique capable of suitably absorbing an engagement shock when a friction engagement device includes a piston whose pressing surface is provided with radial grooves.

Means for Solving the Problem

A friction engagement device according to the present disclosure includes: a friction plate; a tubular member supporting the friction plate; and a piston to press the friction plate from a first axial side that is one side in an axial direction. The tubular member has a tubular shape extending in the axial direction and is disposed on a first radial side that is an outer side or an inner side in a radial direction relative to the friction plate. The tubular member includes an engagement portion on a peripheral surface of the tubular member located on a second radial side opposite to the first radial side in the radial direction. The engagement portion includes at least either a protrusive ridge or protrusive ridges protruding to the second radial side and extending in the axial direction or a recessed groove or recessed grooves recessed to the first radial side and extending in the axial direction. The piston includes a first engaged portion to be brought into engagement with the engagement portion so as to be movable in the axial direction, and a pressing surface formed to face a second axial side opposite to the first axial side in the axial direction so as to press the friction plate. The pressing surface is provided with a radial groove recessed to the first axial side and extending in the radial direction. The friction engagement device further includes an elastic member disposed between the piston and the friction plate in the axial direction so as to be elastically deformed by a pressing force of the piston. The elastic member includes a second engaged portion to be brought into engagement with the engagement portion so as to be movable in the axial direction, and an annular plate portion sandwiched between the pressing surface and the friction plate from both sides in the axial direction. A surface of the annular plate portion facing the first axial side is provided with a projection protruding to the first axial side and a recess recessed to the second axial side, such that the projection and the recess are arranged alternately in a circumferential direction. Assuming that a phase where the radial groove and the projection are located at corresponding positions in the circumferential direction is a particular phase, the engagement portion, the first engaged portion, and the second engaged portion are formed such that the piston and the elastic member are unable to come into engagement with the tubular member at the particular phase.

In this structure, the elastic member to be elastically deformed by the pressing force of the piston is provided between the piston and the friction plate in the axial direction. Thus, an engagement shock resulting from engagement of the friction engagement device is absorbable by elastic deformation of the elastic member to a greater degree than when no such elastic member is provided and the piston directly presses the friction plate.

The above structure involves using the elastic member including the annular plate portion provided with the projection and the recess arranged alternately in the circumferential direction. In the above structure, the pressing surface of the piston is provided with the radial groove. In such a structure, if the piston presses the friction plate, with the radial groove of the pressing surface and the projection of the elastic member disposed at corresponding positions in the circumferential direction, the elastic member may not undergo suitable elastic deformation in accordance with movement of the piston to the second axial side depending on the shape and/or size of the radial groove. This may make it impossible to achieve the effect of absorbing the engagement shock of the friction engagement device as designed.

In this respect, assuming that the phase where the radial groove and the projection are located at corresponding positions in the circumferential direction is the particular phase, the above structure involves forming the engagement portion, the first engaged portion, and the second engaged portion such that the piston and the elastic member are unable to come into engagement with the tubular member at the particular phase. Thus, the piston and the elastic member easily avoid being assembled at the particular phase during assembly of the piston and the elastic member to the tubular member. This facilitates suitably achieving the engagement shock absorbing effect.

As described thus far, the above structure is able to suitably absorb the engagement shock when the friction engagement device includes the piston whose pressing surface is provided with the radial groove.

Further features and advantages of the friction engagement device will be apparent from the description of embodiments given below with reference to the drawings.

MODES FOR CARRYING OUT THE DISCLOSURE

Figure 1:
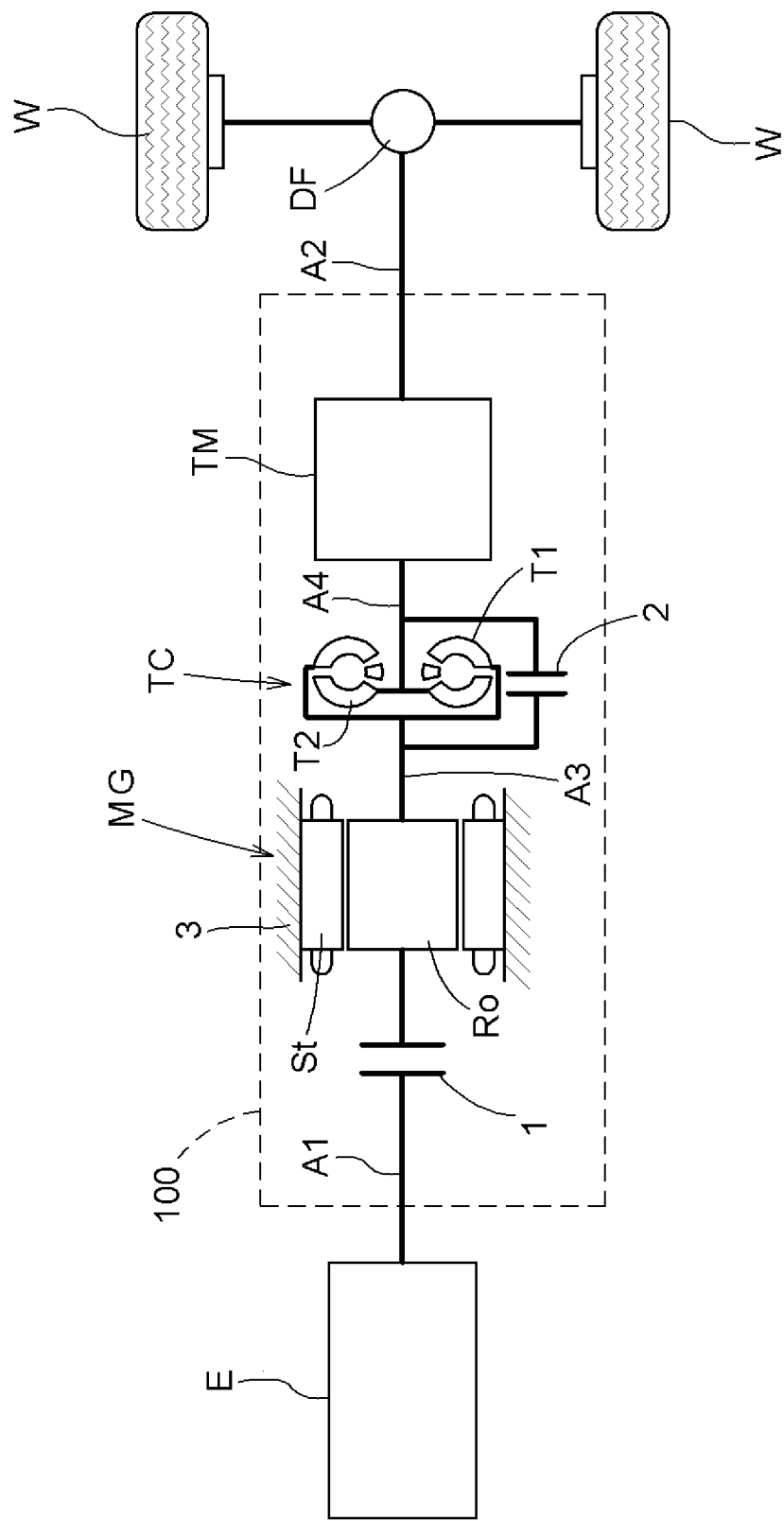
FIG. 1 is a diagram schematically illustrating a structure of a vehicle drive apparatus.

Embodiments of friction engagement devices will be described with reference to the drawings. Unless otherwise specified, the terms "axial direction L", "radial direction R", and "circumferential direction C" in the following description are defined with respect to an axis X of a friction engagement device (which is a first engagement device 1 in the present embodiment). The axis X is the rotation axis of rotary members of the friction engagement device (such as a first support member 30 and a second support member 40 in the present embodiment, which will be described below). One side in the axial direction L will be referred to as a "first axial side L1". The other side in the axial direction L (which is opposite to the first axial side L1 in the axial direction L) will be referred to as a "second axial side L2". In the present embodiment, a radially outer side R1 (i.e., an outer side in the radial direction R) corresponds to a "first radial side", and a radially inner side R2 (i.e., an inner side in the radial direction R) corresponds to a "second radial side". Directions for components in the following description indicate directions for the components assembled to an apparatus (which is a vehicle drive apparatus in the present embodiment) provided with the friction engagement device. As used herein, terms related to, for example, the dimensions, arrangement directions, and arrangement locations of components conceptually include a state where there is a difference resulting from an error (e.g., an error allowable in the course of manufacture).

As used herein, the term "drivingly connected to" refers to a state where two rotary elements are connected to each other such that a driving force (which is synonymous with a torque) is transmittable therebetween, and encompasses a state where the two rotary elements are connected to each other such that the two rotary elements rotate together or a state where the two rotary elements are connected to each other through one or two or more transmission members such that a driving force is transmittable therebetween. Such transmission members include various members (e.g., a shaft, a gear mechanism, a belt, and a chain) that transmit rotation at equal or varying speeds. Such transmission members may include engagement devices (e.g., a friction engagement device and a meshing type engagement device) that transmit rotation and driving force selectively.

As used herein, the term "rotary electric machine" is used as a concept encompassing all of a motor (electric motor), a generator (power generator), and a motor generator that functions as both of a motor and a generator when necessary. When a virtual straight line parallel to the direction of a line of sight is moved in directions perpendicular to the virtual straight line, the term "overlapping as viewed in a particular direction" as used herein for the locations of two components refers to at least partial presence of a region where the virtual straight line intersects both of the two components.

As illustrated in FIG. 1, the first engagement device 1 in the present embodiment is provided in a vehicle drive apparatus 100 including a rotary electric machine MG in a power transmission path through which an input member A1 drivingly connected to an internal combustion engine E is connected to an output member A2 drivingly connected to wheels W, such that the first engagement device 1 is disposed in the power transmission path between the input member A1 and the rotary electric machine MG. Specifically, the vehicle drive apparatus 100 provided with the first engagement device 1 is an apparatus for driving a vehicle (hybrid vehicle) including both of the internal combustion engine E and the rotary electric machine MG each serving as a driving force source for the wheels W. The vehicle drive apparatus 100 transmits torque from one or both of the internal combustion engine E and the rotary electric machine MG to the wheels W so as to cause the vehicle to travel. In the present embodiment, the vehicle on which the vehicle drive apparatus 100 is installed is a "single motor parallel" hybrid vehicle in which the internal combustion engine E and the rotary electric machine MG are connected in series through the first engagement device 1. In the present embodiment, the first engagement device 1 corresponds to a "friction engagement device".

As illustrated in FIG. 1, the vehicle drive apparatus 100 according to the present embodiment includes the first engagement device 1 and the rotary electric machine MG disposed in this order in the power transmission path (through which the input member A1 is connected to the output member A2) from a location adjacent to the input member A1. The first engagement device 1 connects the input member A1 to the rotary electric machine MG selectively (which means that the first engagement device 1 connects or disconnects the input member A1 to or from the rotary electric machine MG). In other words, the first engagement device 1 has the function of disconnecting the internal combustion engine E from the wheels W. The input member A1 is connected to, for example, an output member (such as a crankshaft) of the internal combustion engine E such that the input member A1 rotates together with the output member, or connected to the output member of the internal combustion engine E through, for example, a damper. At the start of the internal combustion engine E, torque of the rotary electric machine MG transmitted through the first engagement device 1, for example, causes rotational driving (or cranking) of the output member of the internal combustion engine E. The output member A2 is drivingly connected to the wheels W through an output differential gear device DF. Rotation and torque transmitted to the output member A2 from the input member A1 and/or component(s) adjacent thereto are distributed and transmitted to the two right and left wheels W through the output differential gear device DF.

Figure 2:
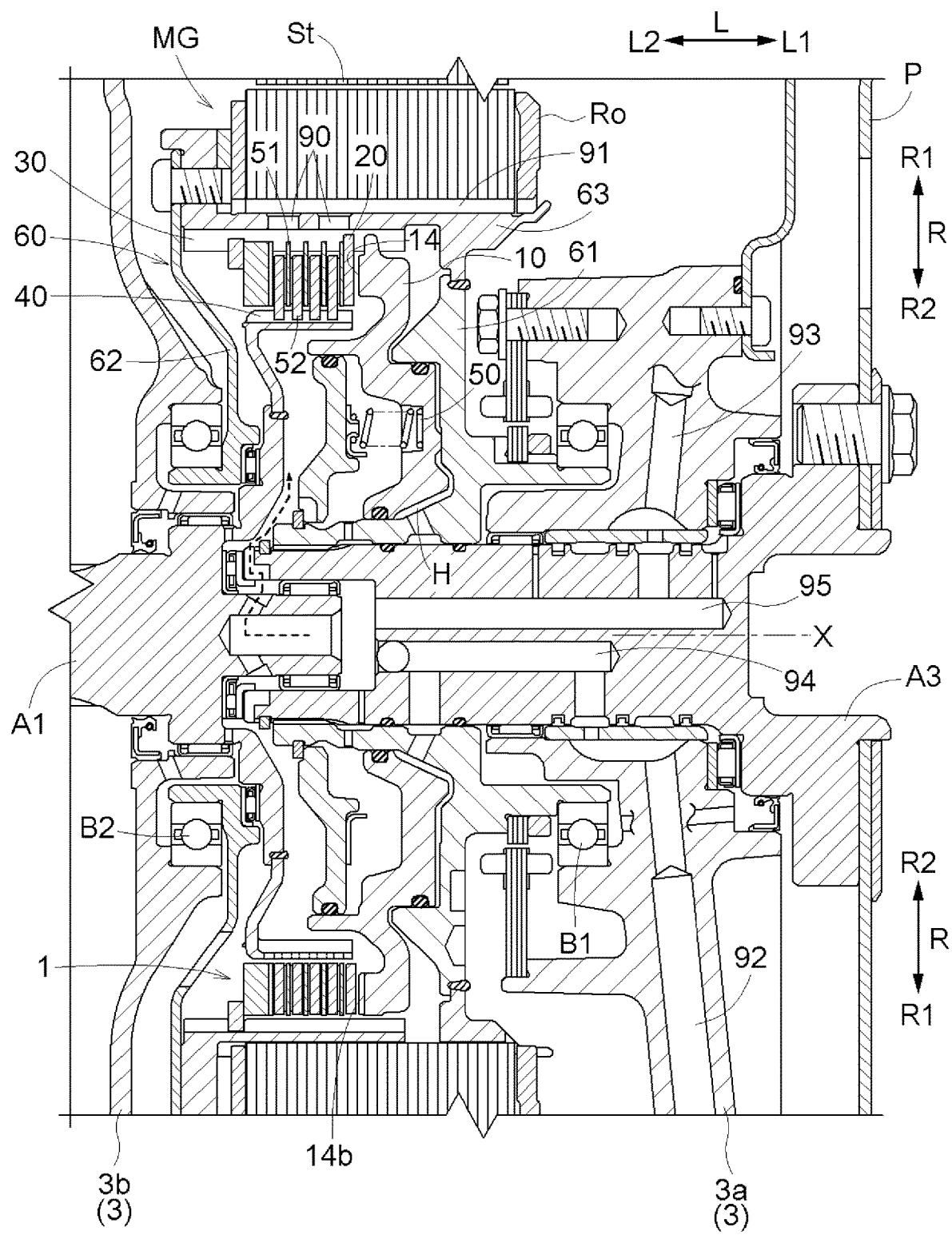
FIG. 2 is a cross-sectional view of a portion of the vehicle drive apparatus.

As illustrated in FIG. 1, the vehicle drive apparatus 100 in the present embodiment includes: a torque converter TC in the power transmission path between the rotary electric machine MG and the output member A2; and a transmission TM in the power transmission path between the torque converter TC and the output member A2. Specifically, a rotor Ro of the rotary electric machine MG is connected to a first intermediate member A3 such that the rotor Ro rotates together with the first intermediate member A3, the first intermediate member A3 is connected to a pump impeller T1 of the torque converter TC such that the first intermediate member A3 rotates together with the pump impeller T1, and a turbine runner T2 of the torque converter TC is connected to a second intermediate member A4 such that the turbine runner T2 rotates together with the second intermediate member A4. The second intermediate member A4 serves as an input member (transmission input member) of the transmission TM. In this embodiment, the first intermediate member A3 is connected to the pump impeller T1 through a flexible plate P as illustrated in FIG. 2 such that the first intermediate member A3 rotates together with the pump impeller T1. The torque converter TC includes a second engagement device 2 through which the pump impeller T1 and the turbine runner T2 are directly connected to each other.

The transmission TM is structured to be able to vary a speed ratio in steps or continuously. The transmission TM changes the rotation speed of the second intermediate member A4 in accordance with a speed ratio at the present time so as to transmit the resulting rotation speed to the output member A2 serving as an output member (transmission output member) of the transmission TM. The transmission TM is, for example, a stepped automatic transmission (automatic stepped transmission) that is able to switch shift speeds for which speed ratios are different. In the present embodiment, the input member A1, the rotary electric machine MG, the torque converter TC, the transmission TM, and the output member A2 are disposed coaxially with the first engagement device 1 (i.e., disposed on the axis X). The vehicle drive apparatus 100 may be structured such that one or both of the torque converter TC and the transmission TM is/are not included.

As illustrated in FIGS. 1 and 2, the rotary electric machine MG includes: a stator St secured to a case 3; and the rotor Ro supported so as to be rotatable relative to the stator St. In the present embodiment, the rotary electric machine MG is an inner rotor type rotary electric machine. The rotor Ro is thus disposed at a location on the radially inner side R2 relative to the stator St where the rotor Ro overlaps with the stator St in a radial view along the radial direction R. As illustrated in FIG. 2, the first engagement device 1 in the present embodiment is disposed on the radially inner side R2 relative to the rotary electric machine MG so as to be coaxial with the rotary electric machine MG. In this embodiment, the first engagement device 1 is disposed at a location on the radially inner side R2 relative to the rotor Ro where the first engagement device 1 overlaps with the rotor Ro in the radial view.

As illustrated in FIG. 2, the case 3 includes: a first wall 3a disposed on the first axial side L1 relative to the first engagement device 1 and the rotary electric machine MG; and a second wall 3b disposed on the second axial side L2 relative to the first engagement device 1 and the rotary electric machine MG. The input member A1 is inserted through a through hole defined in a central portion of the second wall 3b in the radial direction R. The first intermediate member A3 is inserted through a through hole defined in a central portion of the first wall 3a in the radial direction R.

The rotor Ro of the rotary electric machine MG is supported by a first bearing B1 and a second bearing B2 on both sides in the axial direction L such that the rotor Ro is rotatable relative to the case 3. Specifically, the rotor Ro is supported by a support member 60, and the rotor Ro in this state is supported by the first bearing B1 so as to be rotatable relative to the first wall 3a and supported by the second bearing B2 so as to be rotatable relative to the second wall 3b. The support member 60 includes: a rotor support 63 having a cylindrical shape and supporting the rotor Ro from the radially inner side R2; and a first support 61 and a second support 62 each formed to extend in the radial direction R and supporting the rotor support 63 from the radially inner side R2. The rotor support 63 supporting the rotor Ro is disposed on the radially inner side R2 relative to the rotor Ro. The first support 61 and the second support 62 supporting the rotor support 63 are disposed on the radially inner side R2 relative to the rotor support 63.

The first support 61 is disposed to extend to the radially inner side R2 from the rotor support 63 between the first engagement device 1 and the first wall 3a in the axial direction L. The first bearing B1 is disposed between the first support 61 and the first wall 3a. An end of the first support 61 on the radially inner side R2 is connected to the first intermediate member A3 (i.e., spline-connected to the first intermediate member A3 in the present example) such that the first support 61 rotates together with the first intermediate member A3. The rotary electric machine MG (or the rotor Ro) is thus connected to the first intermediate member A3 through the support member 60 such that the rotary electric machine MG (or the rotor Ro) rotates together with the first intermediate member A3. The second support 62 is disposed to extend to the radially inner side R2 from the rotor support 63 between the first engagement device 1 and the second wall 3b in the axial direction L. The second bearing B2 is disposed between the second support 62 and the second wall 3b.

In the present embodiment, the first engagement device 1 is a wet friction engagement device. As illustrated in FIG. 2, the first engagement device 1 includes: first friction plates 51; the first support member 30 supporting the first friction plates 51; and a piston 10 to press the first friction plates 51 from the first axial side L1. The first support member 30 has a tubular shape extending in the axial direction L and is disposed on the first radial side (i.e., the radially outer side R1 in the present embodiment), which is the outer side or the inner side in the radial direction R relative to the first friction plates 51. In other words, the first support member 30 supports the first friction plates 51 from the first radial side (i.e., the radially outer side R1 in the present embodiment), which is one side in the radial direction R. The piston 10 includes a pressing surface 14 formed to face the second axial side L2 so as to press the first friction plates 51. The first engagement device 1 further includes second friction plates 52 and the second support member 40 supporting the second friction plates 52. The second support member 40 has a tubular shape extending in the axial direction L and is disposed on the second radial side (i.e., the radially inner side R2 in the present embodiment) relative to the second friction plates 52. The second radial side is opposite to the first radial side in the radial direction R. In other words, the second support member 40 supports the second friction plates 52 from the second radial side (i.e., the radially inner side R2 in the present embodiment). The piston 10 presses the first friction plates 51 and the second friction plates 52 from the first axial side L1. The first friction plates 51, the piston 10, and an elastic member 20 (which will be described below) are supported so as to be movable in the axial direction L, with their relative rotation with respect to the first support member 30 in the circumferential direction C being restricted. The second friction plates 52 are supported so as to be movable in the axial direction L, with their relative rotation with respect to the second support member 40 in the circumferential direction C being restricted. In the present embodiment, each first friction plate 51 corresponds to a "friction plate", and the first support member 30 corresponds to a "tubular member".

As illustrated in FIG. 2, the first engagement device 1 in the present embodiment includes more than one first friction plate 51 and more than one second friction plate 52. The first friction plates 51 and the second friction plates 52 are disposed one by one alternately in the axial direction L. The first friction plates 51 and the second friction plates 52 each have an annular plate shape. The first friction plates 51 and the second friction plates 52 are disposed coaxially (i.e., disposed on the axis X) such that friction abutment surfaces thereof (i.e., end faces thereof facing in the axial direction L) are allowed to come into abutment with each other in the axial direction L.

In the present embodiment, the first support member 30 is connected to the rotor Ro of the rotary electric machine MG such that the first support member 30 rotates together with the rotor Ro, and the second support member 40 is connected to the input member A1 such that the second support member 40 rotates together with the input member A1. Specifically, as illustrated in FIG. 2, the first support member 30 is structured to rotate together with the rotor support 63 supporting the rotor Ro from the radially inner side R2. In this embodiment, the first support member 30 is integral with the rotor support 63. The first support member 30 may be a member separate from the rotor support 63 and may be connected to (e.g., spline-connected to) the rotor support 63 such that the first support member 30 rotates together with the rotor support 63. The second support member 40 is connected to a flange of the input member A1 through a radial extension formed to extend to the radially inner side R2 from the second support member 40. In a pressing state where the piston 10 is pressing the first friction plates 51 and the second friction plates 52, the engagement state of the first engagement device 1 is brought to a slidingly engaged state or a directly engaged state, thus connecting the input member A1 to the rotary electric machine MG. In a non-pressing state where the piston 10 is not pressing the first friction plates 51 and the second friction plates 52, the engagement state of the first engagement device 1 is brought to a released state, thus disconnecting the input member A1 from the rotary electric machine MG.

In the present embodiment, the first engagement device 1 is a hydraulically operated engagement device including a hydraulically operated component (which is a hydraulic servo mechanism in this embodiment) that operates in accordance with an oil pressure supplied thereto. Specifically, as illustrated in FIG. 2, the first engagement device 1 includes: the piston 10 described above; an oil chamber H to move the piston 10 in the axial direction L; and an urging member 50 (which is a coil spring in this example) urging the piston 10 in a direction opposite to the direction of pressing by an oil pressure. Moving the piston 10 in the axial direction L in accordance with the oil pressure of the oil chamber H controls the state of engagement of the first engagement device 1. In the present embodiment, an oil pressure that has been controlled by a hydraulic controller (not illustrated) is supplied to the oil chamber H through a second oil passage 92 defined in the first wall 3a and a fourth oil passage 94 defined inside the first intermediate member A3 in this order. In the present embodiment, the first engagement device 1 is a normally open type engagement device. The oil chamber H is defined on the first axial side L1 relative to the piston 10. The urging member 50 is provided so as to urge the piston 10 to the first axial side L1.

As indicated by the associated broken line (which represents how oil flows) in FIG. 2, the present embodiment involves supplying oil to the first friction plates 51 and the second friction plates 52 from the radially inner side R2. Specifically, an end of the input member A1 on the first axial side L1 has a cylindrical shape such that oil in an internal space surrounded and defined by an inner peripheral surface of the cylindrical portion is supplied to the first friction plates 51 and the second friction plates 52 from the radially inner side R2 with centrifugal force resulting from rotation of the input member A1. In the present embodiment, an oil pressure that has been controlled by a hydraulic controller (not illustrated) is supplied to the internal space of the input member A1 through a third oil passage 93 defined in the first wall 3a and a fifth oil passage 95 defined inside the first intermediate member A3 in this order.

The oil, which has been supplied to the first friction plates 51 and the second friction plates 52 from the radially inner side R2, flows to the radially outer side R1 between the first friction plates 51 and the second friction plates 52 while cooling the friction plates and is then supplied to the inner peripheral surface of the rotor support 63. In the present embodiment, the first support member 30 is integral with the rotor support 63 as previously mentioned, so that the inner peripheral surface of the rotor support 63 is defined by the inner peripheral surface of the first support member 30. The rotor support 63 (or the first support member 30) is provided with supply oil passages 90 (which are oil holes in this embodiment) through which a first oil passage 91 defining an oil passage for cooling the rotary electric machine MG is in communication with the inner peripheral surface of the rotor support 63 (or the inner peripheral surface of the first support member 30). The oil supplied to the inner peripheral surface of the rotor support 63 is thus suppliable to the first oil passage 91 through the supply oil passages 90 so as to cool the rotary electric machine MG.

In the pressing state where the piston 10 is pressing the first friction plates 51 and the second friction plates 52, the amount of oil flowable to the radially outer side R1 between the first friction plates 51 and the second friction plates 52 is smaller than when the piston 10 is in the non-pressing state where the piston 10 is not pressing the first friction plates 51 and the second friction plates 52. The same goes for the case where the friction abutment surfaces of either the first friction plates 51 or the second friction plates 52 or both of the first friction plates 51 and the second friction plates 52 are provided with groove-like portions extending in the radial direction R. Although the amount of oil flowable to the radially outer side R1 between the first friction plates 51 and the second friction plates 52 is smaller in the pressing state as just described, the pressing surface 14 of the piston 10 of the first engagement device 1 is provided with radial grooves 14b recessed to the first axial side L1 and extending in the radial direction R. Thus, if the piston 10 is in the pressing state, the oil supplied to the first friction plates 51 and the second friction plates 52 from the radially inner side R2 would be allowed to flow to the radially outer side R1 through the radial grooves 14b. This makes it possible to maintain the amount of oil supplied to the inner peripheral surface of the rotor support 63 (i.e., the amount of oil supplied to the supply oil passages 90) at a suitable level. The supply oil passages 90 mentioned above are disposed outward of the piston 10 in the radial direction R. More specifically, the present embodiment involves providing the supply oil passages 90 which are disposed outward of the piston 10 in the radial direction R and through which oil that has passed through the radial grooves 14b is supplied to the rotary electric machine MG. The purpose of providing the radial grooves 14b is not limited to cooling the rotary electric machine MG. The radial grooves 14b may allow oil to flow to the radially outer side R1 therethrough so as to adjust the amount of oil to be discharged from a region where the first friction plates 51 and the second friction plates 52 are disposed (e.g., to positively discharge oil therefrom).

As illustrated in FIG. 2, the first engagement device 1 includes the elastic member 20 disposed between the piston 10 and the first friction plates 51 in the axial direction L so as to be elastically deformed by the pressing force of the piston 10. The elastic member 20 is disposed on the first axial side L1 relative to all of the first friction plates 51 and all of the second friction plates 52. The piston 10 thus presses the first friction plates 51 and the second friction plates 52 from the first axial side L1 through the elastic member 20. Providing the elastic member 20 just described makes it possible to absorb an engagement shock, resulting from engagement of the first engagement device 1, by elastic deformation of the elastic member 20 to a greater degree than when the piston 10 presses the first friction plates 51 directly.

Figure 5:
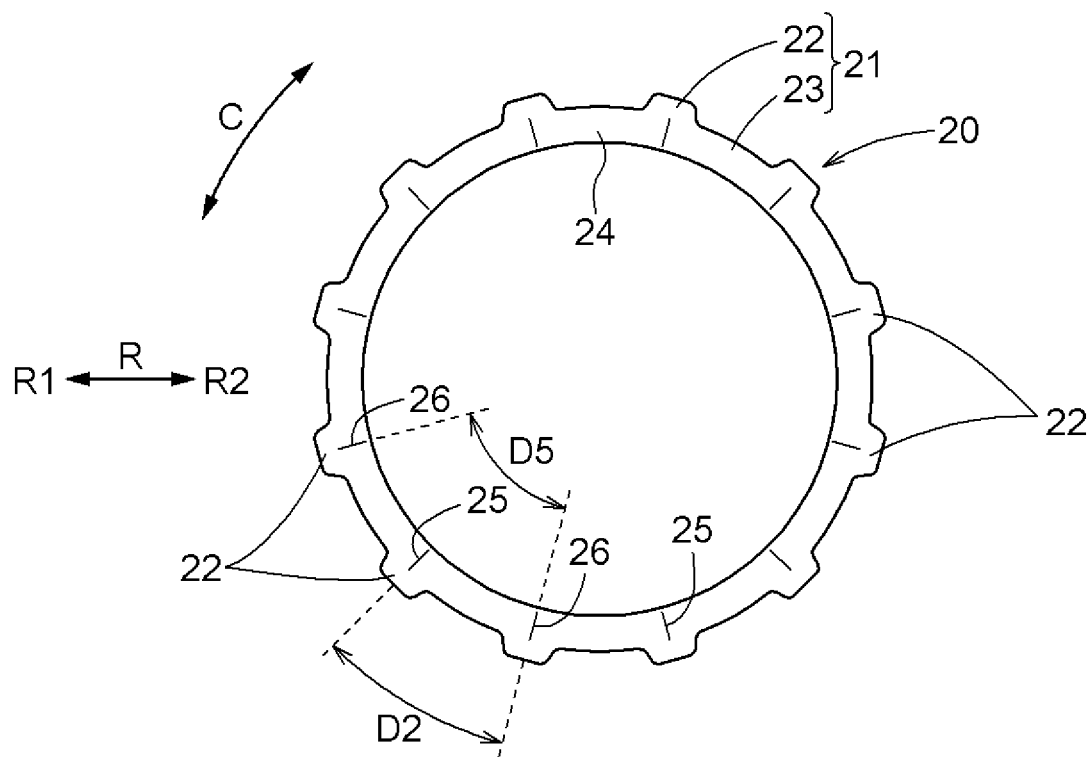
FIG. 5 is an axial view of an elastic member.
Figure 8:
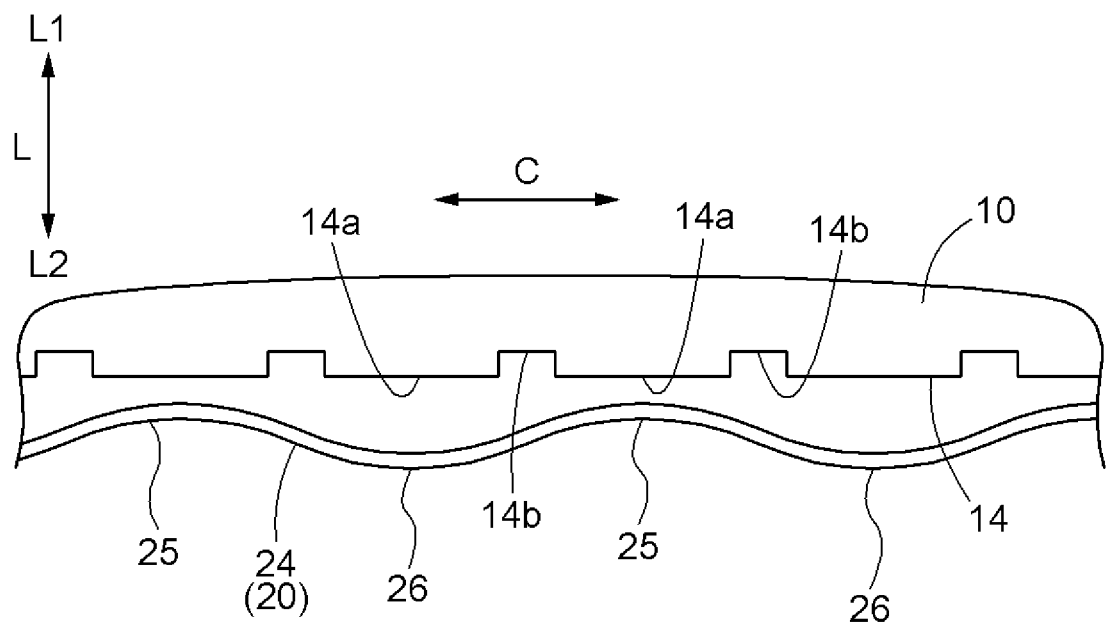
FIG. 8 is a diagram illustrating a positional relationship between the piston and the elastic member in a circumferential direction in the state illustrated in FIG. 7.

As illustrated in FIGS. 5 and 8, the elastic member 20 includes an annular plate portion 24 sandwiched between the pressing surface 14 of the piston 10 and the first friction plates 51 from both sides in the axial direction L. A surface of the annular plate portion 24 facing the first axial side L1 is provided with: projections 25 protruding to the first axial side L1; and recesses 26 recessed to the second axial side L2. The projections 25 and the recesses 26 are provided alternately in the circumferential direction C. The projections 25 are disposed at fifth intervals D5 in the circumferential direction C. The recesses 26 are also disposed at the fifth intervals D5 in the circumferential direction C. Each recess 26 is provided between adjacent two of the projections 25 in the circumferential direction C so as to be located centrally therebetween in the circumferential direction C. In other words, the projections 25 and the recesses 26 are provided alternately at half the fifth intervals D5 in the circumferential direction C.

As illustrated in FIG. 8, the annular plate portion 24 in the present embodiment has a corrugated plate shape in which the projections 25 and the recesses 26 are provided alternately in the circumferential direction C. Thus, a surface of the annular plate portion 24 facing the second axial side L2 is provided with: recesses recessed to the first axial side L1 and located at positions corresponding to those of the projections 25 in the circumferential direction C; and projections protruding to the second axial side L2 and located at positions corresponding to those of the recesses 26 in the circumferential direction C. When the piston 10 presses the first friction plates 51, the annular plate portion 24 having a corrugated plate shape elastically deforms into a flat plate shape. This brings the pressing surface 14 into surface contact with the annular plate portion 24 and brings the annular plate portion 24 into surface contact with the first friction plate 51. When the piston 10 stops pressing the first friction plates 51, the annular plate portion 24 restores its corrugated plate shape. FIG. 5 illustrates, by way of example, the annular plate portion 24 formed continuously throughout its entire region in the circumferential direction C. Alternatively, the annular plate portion 24 may be formed partially discontinuously in the circumferential direction C. The elastic member 20 (or the annular plate portion 24) is similar in structure to, for example, a wave spring or a wave washer.

Figure 4:
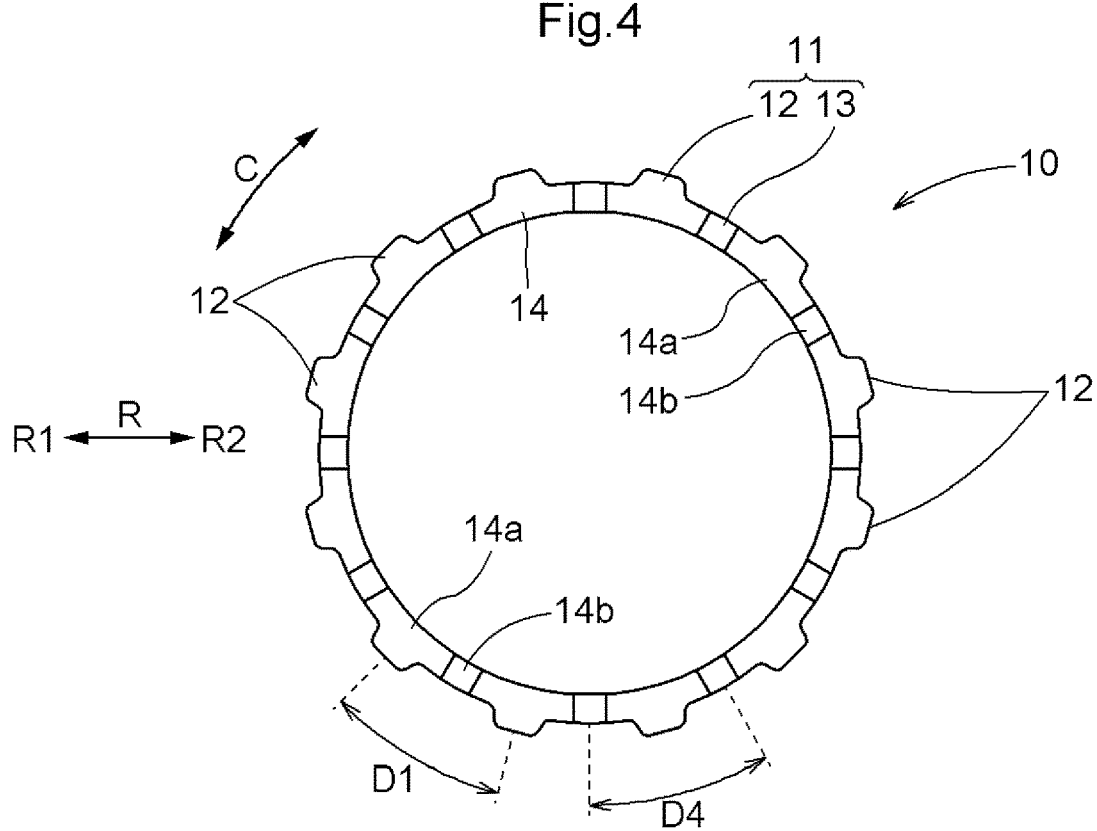
FIG. 4 is an axial view of a piston.
Figure 10:
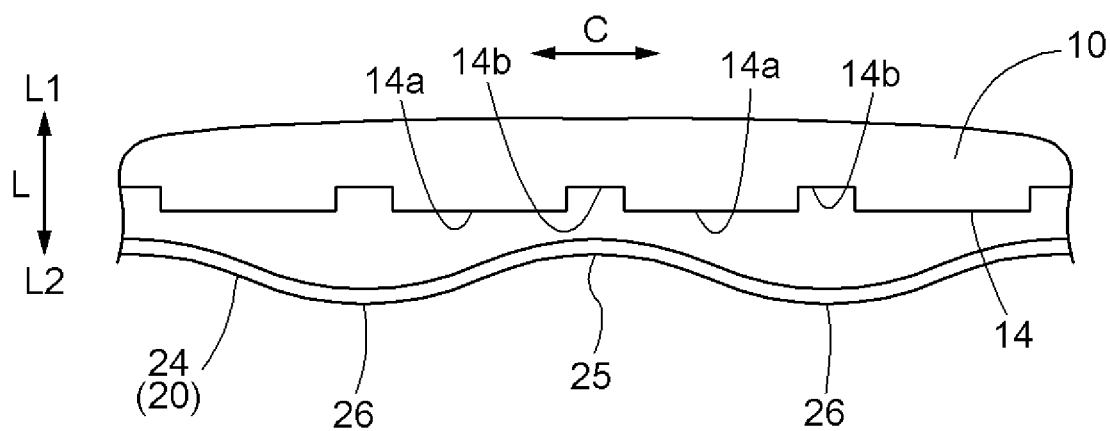
FIG. 10 is a diagram illustrating a positional relationship between the piston and the elastic member in the circumferential direction in the state illustrated in FIG. 9.

As previously mentioned, the pressing surface 14 of the piston 10 is provided with the radial grooves 14b. Thus, when the piston 10 presses the first friction plates 51, with the radial grooves 14b of the pressing surface 14 and the projections 25 of the elastic member 20 disposed at corresponding positions in the circumferential direction C as illustrated in FIG. 10, the elastic member 20 may not undergo suitable elastic deformation in accordance with movement of the piston 10 to the second axial side L2 depending on the shape and/or size of each radial groove 14b. This may make it impossible to achieve the effect of absorbing the engagement shock of the first engagement device 1 as designed. As illustrated in FIG. 4, the radial grooves 14b are provided at fourth intervals D4 in the circumferential direction C.

In view of this point, assuming that a phase where the radial grooves 14b and the projections 25 are located at corresponding positions in the circumferential direction C is a particular phase, the first engagement device 1 is structured such that the piston 10 and the elastic member 20 are unable to come into engagement with the first support member 30 at the particular phase as will be described below. Specifically, assuming that portions of the pressing surface 14 where no radial grooves 14b are provided are pressers 14a and that a phase where the pressers 14a (more specifically, central portions of the pressers 14a in the circumferential direction C in this embodiment) and the projections 25 are located at corresponding positions in the circumferential direction C is a suitable phase, the first engagement device 1 is structured such that the piston 10 and the elastic member 20 are able to come into engagement with the first support member 30 only at the suitable phase. This makes it possible to facilitate assembling the piston 10 and the elastic member 20 to the first support member 30.

In the present embodiment, the fourth intervals D4 are half of the fifth intervals D5. Thus, when the phase is the suitable phase as illustrated in FIG. 8, one of adjacent two of the pressers 14a in the circumferential direction C is disposed at a position corresponding to that of the associated projection 25 in the circumferential direction C, and the other one of the adjacent two of the pressers 14a is disposed at a position corresponding to that of the associated recess 26 in the circumferential direction C. The relationship between the fourth intervals D4 and the fifth intervals D5 is suitably changeable within the range in which each fourth interval D4 is an integral multiple of each fifth interval D5 or each fifth interval D5 is an integral multiple of each fourth intervals D4. In one example, each fourth interval D4 may be equal to each fifth interval D5. In this case, a phase where all of the pressers 14a are disposed at positions corresponding to those of the projections 25 in the circumferential direction C may be the suitable phase.

Figure 3:
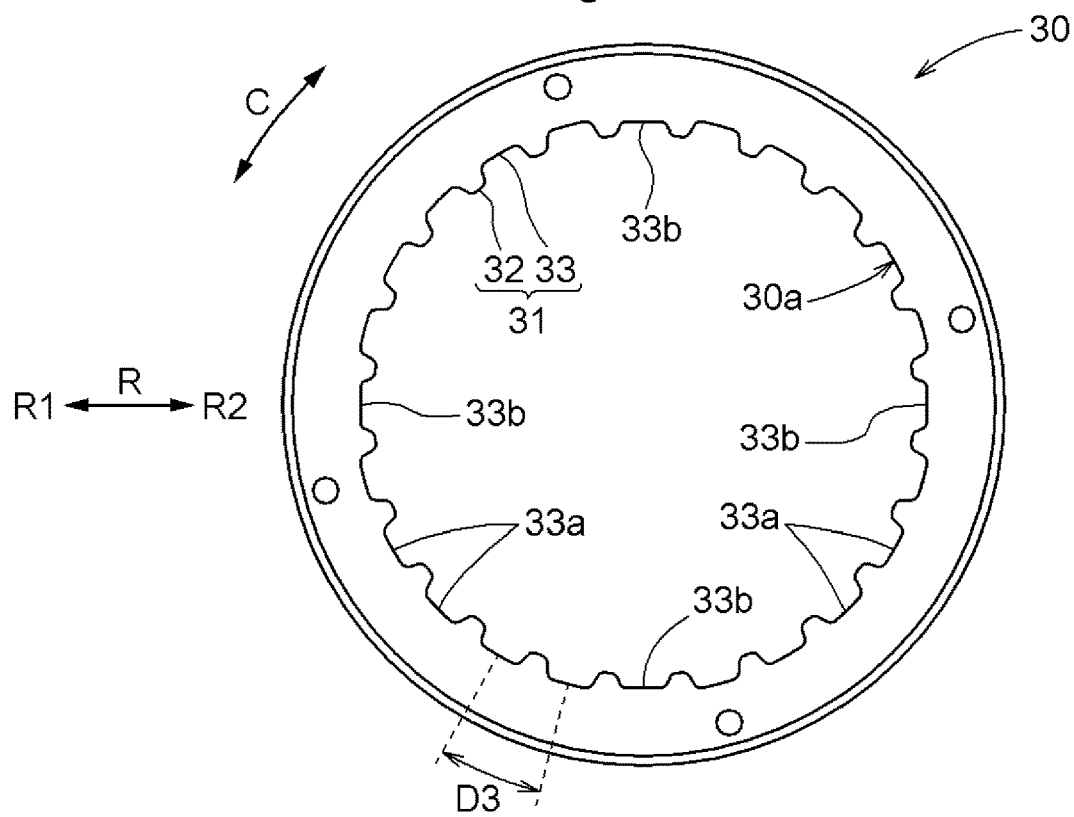
FIG. 3 is an axial view of a first support member.

As illustrated in FIG. 3, the first support member 30 supporting the first friction plates 51 includes an engagement portion 31 on a peripheral surface 30a of the first support member 30 located on the second radial side. In the present embodiment, the first radial side is the radially outer side R1 and the second radial side is the radially inner side R2 as previously mentioned. The first support member 30 thus includes, on its inner peripheral surface (which is the peripheral surface 30a), the engagement portion 31. As illustrated in FIG. 4, the piston 10 includes a first engaged portion 11 to be brought into engagement with the engagement portion 31 such that the piston 10 is movable in the axial direction L. The first engaged portion 11 is provided on a peripheral edge of the piston 10 located on the first radial side (which is the radially outer side R1 in this embodiment). As illustrated in FIG. 5, the elastic member 20 includes a second engaged portion 21 to be brought into engagement with the engagement portion 31 such that the elastic member 20 is movable in the axial direction L. The second engaged portion 21 is provided on a peripheral edge of the elastic member 20 located on the first radial side (which is the radially outer side R1 in this embodiment). Although not illustrated, the first friction plates 51 include engagement portions to be brought into engagement with the engagement portion 31 such that the first friction plates 51 are movable in the axial direction L. The engagement portions are provided on peripheral edges of the first friction plates 51 located on the first radial side (which is the radially outer side R1 in this embodiment). Accordingly, the engagement portion 31 provided on the peripheral surface 30a of the first support member 30 serves as a shared engagement portion for supporting the first friction plates 51, the piston 10, and the elastic member 20 such that the first friction plates 51, the piston 10, and the elastic member 20 are movable in the axial direction L.

As will be described below, the first engagement device 1 is provided with the engagement portion 31, the first engaged portion 11, and the second engaged portion 21 such that the piston 10 and the elastic member 20 are unable to come into engagement with the first support member 30 at the particular phase.

As illustrated in FIG. 3, the engagement portion 31 includes at least either protrusive ridge(s) 32 protruding to the second radial side (which is the radially inner side R2 in this embodiment) and extending in the axial direction L or recessed groove(s) 33 recessed to the first radial side (which is the radially outer side R1) and extending in the axial direction L. In the present embodiment, the engagement portion 31 includes both of the protrusive ridge(s) 32 and the recessed groove(s) 33 as illustrated in FIG. 3. The following description focuses on the recessed groove(s) 33.

As illustrated in FIG. 3, the engagement portion 31 includes the recessed grooves 33 at a plurality of locations in the circumferential direction C. The engagement portion 31 includes an even number of the recessed grooves 33. The recessed grooves 33 are disposed at third intervals D3 in the circumferential direction C. As illustrated in FIG. 4, the first engaged portion 11 includes, at a plurality of locations in the circumferential direction C, first projections 12 protruding to the first radial side from the peripheral edge of the piston 10 on the first radial side (which is the radially outer side R1 in this embodiment). The first engaged portion 11 includes an even number of the first projections 12. The first projections 12 are disposed at first intervals D1 in the circumferential direction C. First recesses 13 are each provided between adjacent two of the first projections 12 in the circumferential direction C. The first recesses 13 are recessed to the second radial side (which is the radially inner side R2 in this embodiment) from the peripheral edge of the piston 10 on the first radial side (which is the radially outer side R1 in this embodiment). As illustrated in FIG. 5, the second engaged portion 21 includes, at a plurality of locations in the circumferential direction C, second projections 22 protruding to the first radial side from the peripheral edge of the elastic member 20 on the first radial side (which is the radially outer side R1 in this embodiment). The second engaged portion 21 includes an even number of the second projections 22. The second projections 22 are disposed at second intervals D2 in the circumferential direction C. Second recesses 23 are each provided between adjacent two of the second projections 22 in the circumferential direction C. The second recesses 23 are recessed to the second radial side (which is the radially inner side R2 in this embodiment) from the peripheral edge of the elastic member 20 on the first radial side (which is the radially outer side R1 in this embodiment).

In the present embodiment, the first intervals D1 are equal to the second intervals D2. In this embodiment, the first intervals D1 and the second intervals D2 are equal to the fourth intervals D4. The third intervals D3 are half of the fourth intervals D4. In other words, the third intervals D3 are each shorter than any of the first intervals D1 and the second intervals D2. Specifically, the third intervals D3 are half of the first intervals D1 and half of the second intervals D2.

As illustrated in FIG. 4, all of the first projections 12 included in the first engaged portion 11 are formed to have identical shapes. As illustrated in FIG. 5, all of the second projections 22 included in the second engaged portion 21 are formed to have identical shapes. In the present embodiment, the first projections 12 and the second projections 22 are formed to have identical shapes. As illustrated in FIG. 3, the recessed grooves 33 include: normal recessed grooves 33a each having a shape engageable with any of the first projections 12 and the second projections 22; and particular recessed grooves 33b having a shape non-engageable with any of the first projections 12 and the second projections 22. The particular recessed grooves 33b are smaller in at least either width in the circumferential direction C or depth in the radial direction R than the normal recessed grooves 33a and are thus formed to be non-engageable with any of the first projections 12 and the second projections 22. In the present embodiment, the particular recessed grooves 33b are formed so as to be smaller in depth in the radial direction R than the normal recessed grooves 33a.

At least one particular recessed groove 33b is included in the recessed grooves 33. In the present embodiment, more than one particular recessed groove 33b is included in the recessed grooves 33. When more than one particular recessed groove 33b is included in the recessed grooves 33 as just described, the particular recessed grooves 33b are provided at intervals, the lengths of which are even multiples of the lengths of the third intervals D3, in the circumferential direction C. In the example illustrated in FIG. 3, the number of particular recessed grooves 33b is four in total, and the four particular recessed grooves 33b are provided at intervals six times longer than the third intervals D3 in the circumferential direction C.

Figure 6:
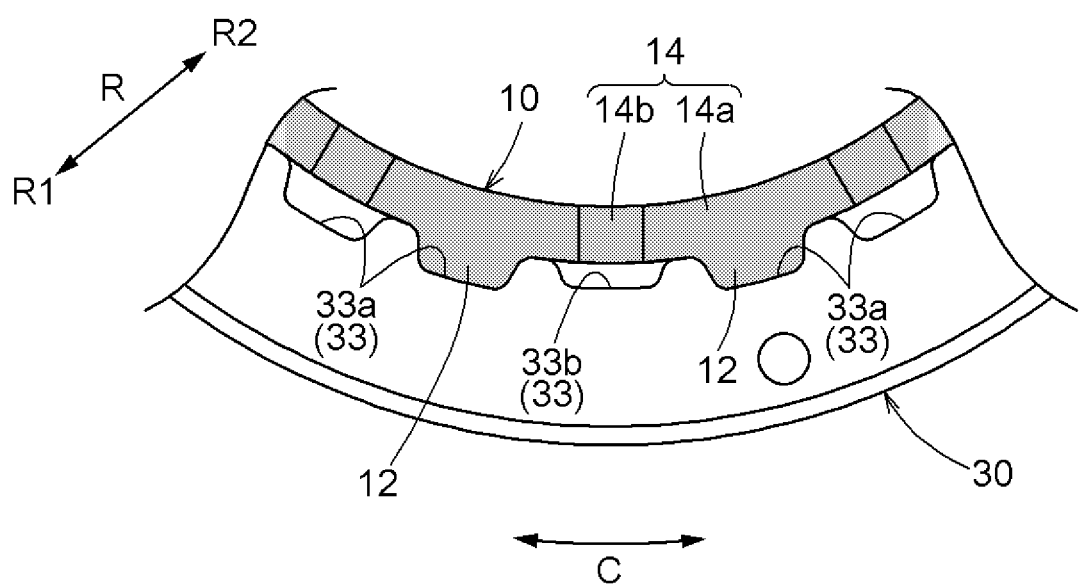
FIG. 6 is a diagram illustrating a state where the piston is assembled to the first support member.
Figure 7:
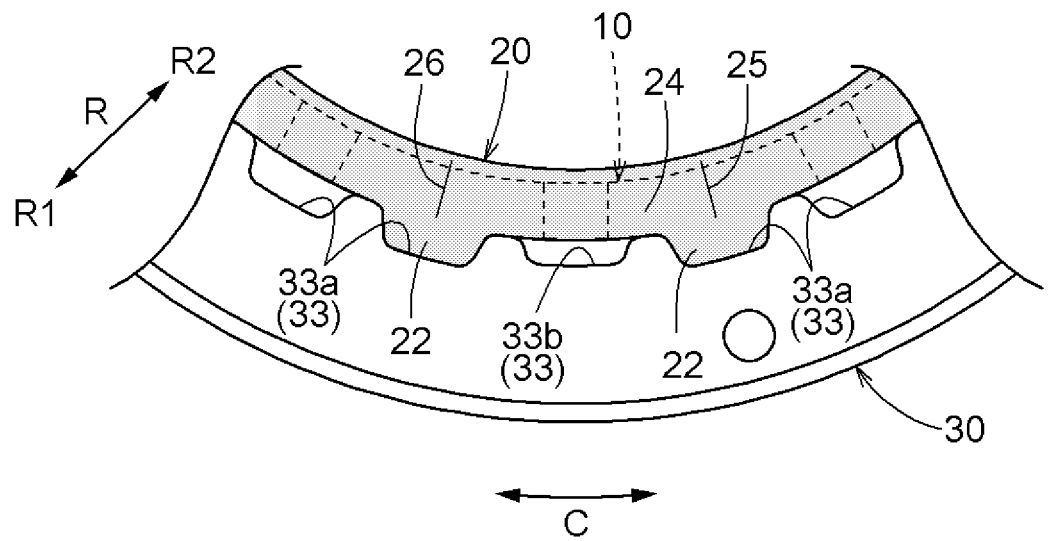
FIG. 7 is a diagram illustrating a state where the piston and the elastic member are assembled to the first support member.

Because the engagement portion 31, the first engaged portion 11, and the second engaged portion 21 are provided as described above, the piston 10 is able to be brought into engagement with the first support member 30 only at a phase where all of the first projections 12 are disposed at positions corresponding to those of the associated normal recessed grooves 33a in the circumferential direction C as partially illustrated in FIG. 6. To facilitate understanding, the piston 10 illustrated in FIG. 6 is highlighted by hatching. As partially illustrated in FIG. 7, the elastic member 20 is able to be brought into engagement with the first support member 30 only at a phase where all of the second projections 22 are disposed at positions corresponding to those of the associated normal recessed grooves 33a in the circumferential direction C. To facilitate understanding, the elastic member 20 illustrated in FIG. 7 is highlighted by hatching. Although the recessed grooves 33 are disposed at the third intervals D3 in the circumferential direction C, the piston 10 and the elastic member 20 are able to be brought into engagement with the first support member 30 not at an angle equivalent to each third interval D3 but only at an angle equivalent to an interval twice as long as each third interval D3 (which is an angle relative to the first support member 30 around the axis X). The piston 10 and the elastic member 20 are able to be brought into engagement with the first support member 30 only at a phase where each first projection 12 and the associated second projection 22 are located at corresponding positions in the circumferential direction C.

In the present embodiment, the radial grooves 14b are each provided between adjacent two of the first projections 12 in the circumferential direction C so as to be located centrally therebetween in the circumferential direction C as illustrated in FIG. 4, and the projections 25 and the recesses 26 are provided at positions corresponding to those of the associated second projections 22 in the circumferential direction C as illustrated in FIG. 5. Thus, as illustrated in FIGS. 7 and 8, the pressers 14a (i.e., central portions of the pressers 14a in the circumferential direction C in this embodiment) and the projections 25 are disposed at corresponding positions in the circumferential direction C at the phase where each first projection 12 and the associated second projection 22 are located at corresponding positions in the circumferential direction C. As previously described, the piston 10 and the elastic member 20 are able to be brought into engagement with the first support member 30 only at the phase where each first projection 12 and the associated second projection 22 are located at corresponding positions in the circumferential direction C. Accordingly, the piston 10 and the elastic member 20 are able to be brought into engagement with the first support member 30 only at the suitable phase where the pressers 14a and the projections 25 are located at corresponding positions in the circumferential direction C.

Figure 9:
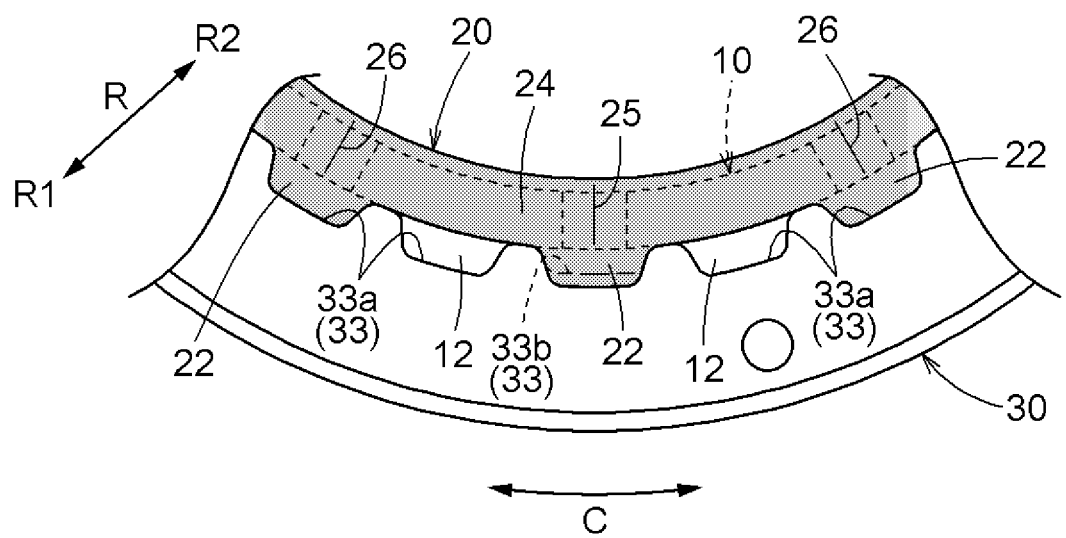
FIG. 9 is a diagram illustrating a state where the elastic member is disposed at a particular phase relative to the piston assembled to the first support member.

Suppose that as illustrated in FIG. 9, the elastic member 20 is rotated by an angle equivalent to each third interval D3 from the state illustrated in FIG. 7. Then, as illustrated in FIG. 10, the piston 10 and the elastic member 20 are disposed at the particular phase where the radial grooves 14b and the projections 25 are located at corresponding positions in the circumferential direction C. In this case, however, the second projections 22 are disposed at positions corresponding to those of the particular recessed grooves 33b in the circumferential direction C, making it impossible to bring the elastic member 20 into engagement with the first support member 30. Although not illustrated, the piston 10 may be rotated by an angle equivalent to each third interval D3 from the state illustrated in FIG. 7. Also in this case, the piston 10 and the elastic member 20 are disposed at the particular phase. In this case, however, the first projections 12 are disposed at positions corresponding to those of the particular recessed grooves 33b in the circumferential direction C, making it impossible to bring the piston 10 into engagement with the first support member 30. As just described, at the particular phase, at least either the first projections 12 or the second projections 22 (i.e., either the first projections 12 or the second projection 22 in this embodiment) are disposed at positions corresponding to those of the particular recessed grooves 33b in the circumferential direction C. Accordingly, the piston 10 and the elastic member 20 are unable to be brought into engagement with the first support member 30 at the particular phase.

Although not described in detail, the engagement portion (i.e., the engagement portion to be brought into engagement with the engagement portion 31) provided on the peripheral edge of each first friction plate 51 on the first radial side (which is the radially outer side R1 in this embodiment) includes, at a plurality of locations in the circumferential direction C, projections protruding to the first radial side from the peripheral edge. When not only the normal recessed grooves 33a but also the particular recessed grooves 33b are engageable with these projections, the first friction plates 51 are able to be brought into engagement with the first support member 30 at an angle equivalent to each third interval D3 (which is an angle relative to the first support member 30 around the axis X) unlike the piston 10 or the elastic member 20.

Alternative Embodiments

Alternative embodiments of the friction engagement device will be described below.

(1) The above embodiment has illustrated, by way of example, the case where the engagement portion 31, the first engaged portion 11, and the second engaged portion 21 are formed such that at least either the first projections 12 or the second projections 22 are disposed at positions corresponding to those of the particular recessed grooves 33b in the circumferential direction C at the particular phase, thus providing a structure in which the piston 10 and the elastic member 20 are unable to be brought into engagement with the first support member 30 at the particular phase. The structures of the engagement portion 31, the first engaged portion 11, and the second engaged portion 21 for providing the structure in which the piston 10 and the elastic member 20 are unable to be brought into engagement with the first support member 30 at the particular phase, however, are not limited to those described above. Other examples of the structures of the engagement portion 31, the first engaged portion 11, and the second engaged portion 21 for providing the structure in which the piston 10 and the elastic member 20 are unable to be brought into engagement with the first support member 30 at the particular phase will be described below with reference to FIGS. 11 to 14.

Figure 11:
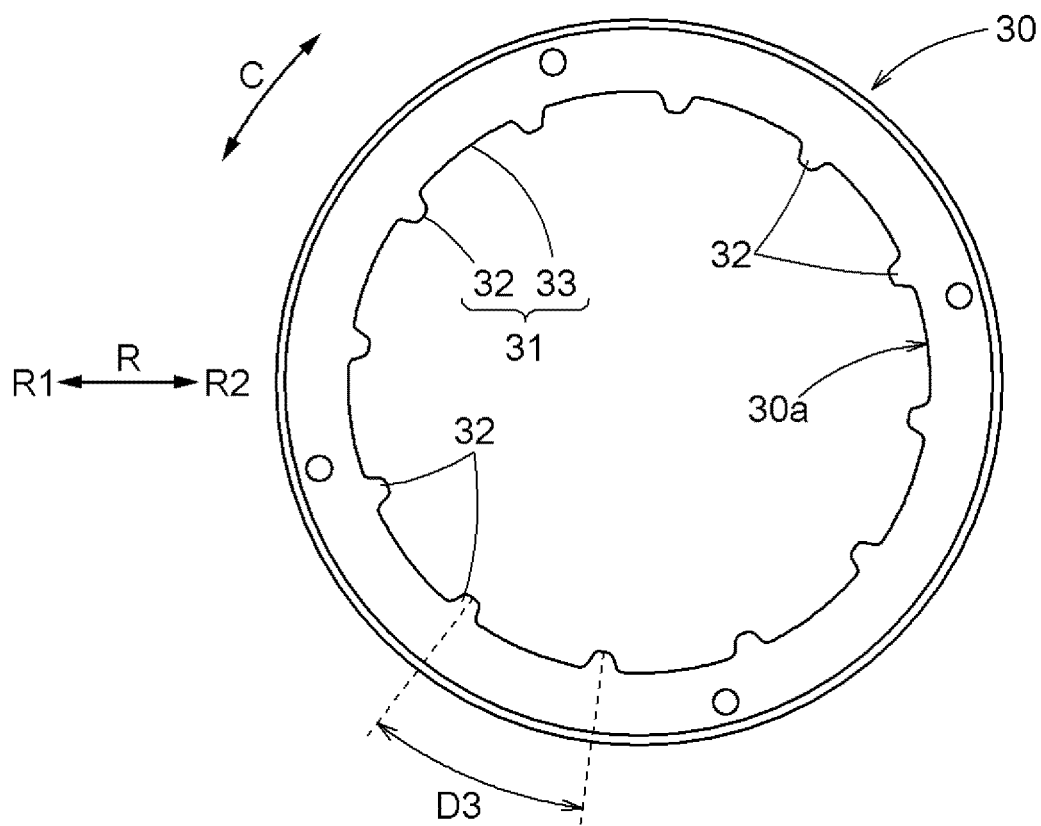
FIG. 11 is an axial view of a first support member according to an alternative embodiment.
Figure 12:
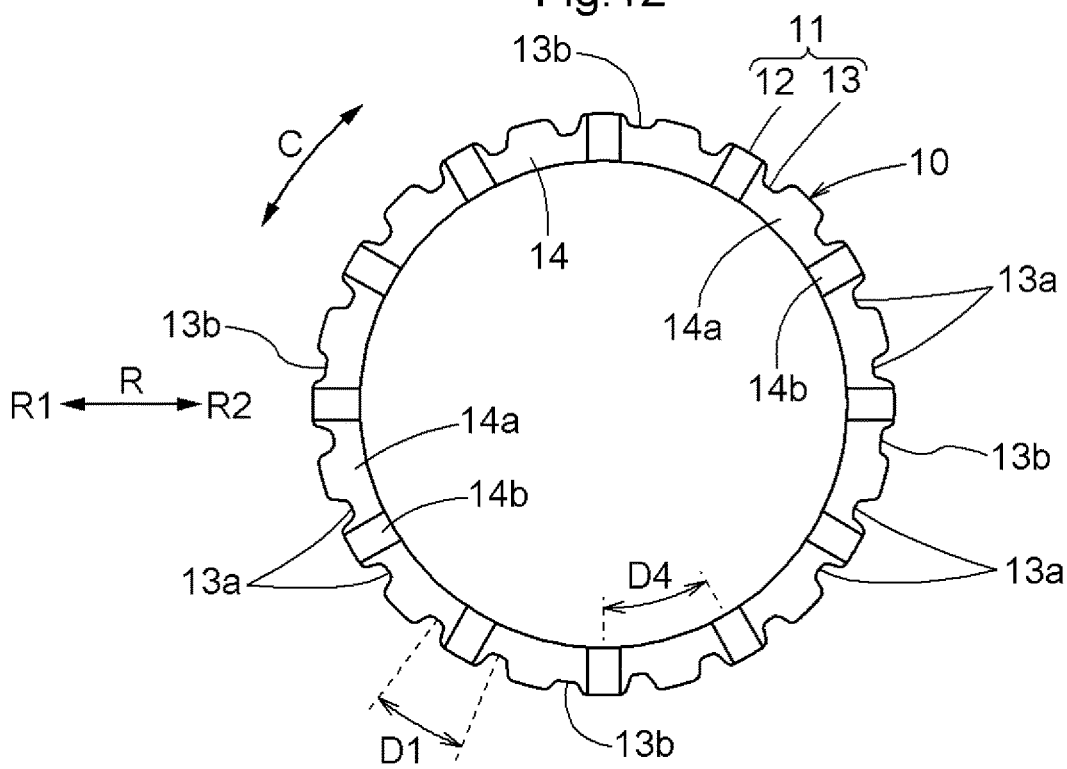
FIG. 12 is an axial view of a piston according to the alternative embodiment.
Figure 13:
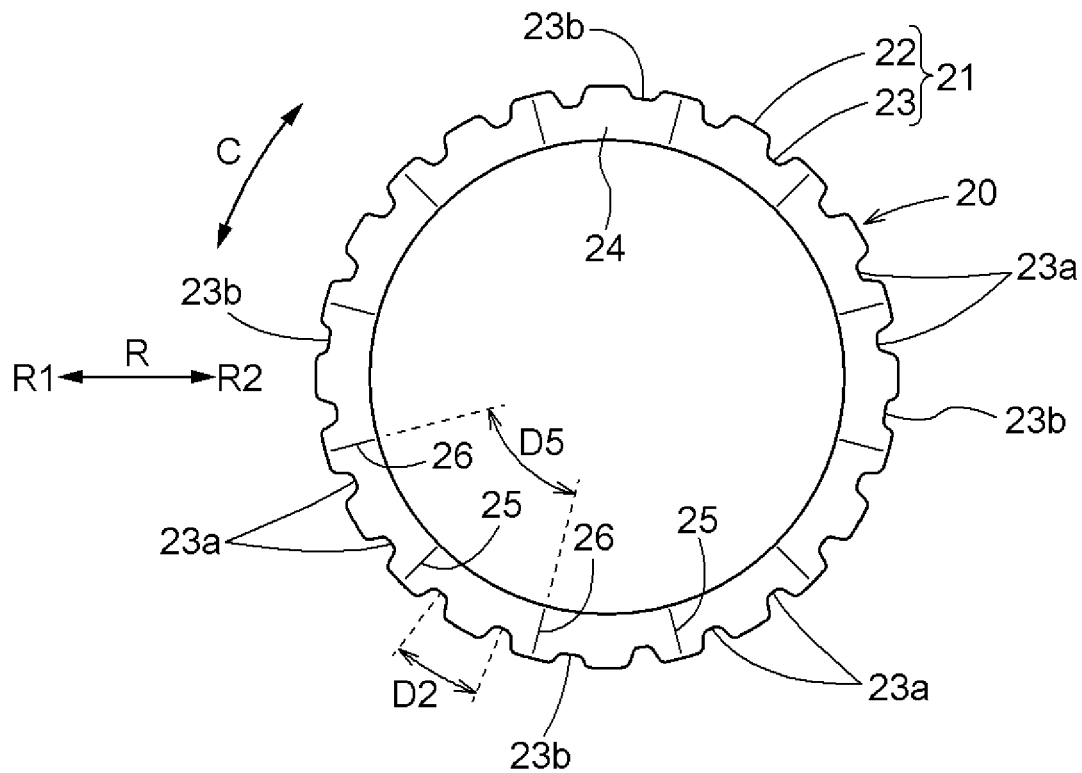
FIG. 13 is an axial view of an elastic member according to the alternative embodiment.

As illustrated in FIG. 11, the engagement portion 31 includes the protrusive ridges 32 at a plurality of locations in the circumferential direction C. The engagement portion 31 includes an even number of the protrusive ridges 32. Although the engagement portion 31 includes both of the protrusive ridges 32 and the recessed grooves 33 also in the present example, the following description focuses on the protrusive ridges 32. The protrusive ridges 32 are disposed at the third intervals D3 in the circumferential direction C. As illustrated in FIG. 12, the first engaged portion 11 includes the first recesses 13 at a plurality of locations in the circumferential direction C. The first engaged portion 11 includes an even number of the first recesses 13. The first recesses 13 are disposed at the first intervals D1 in the circumferential direction C. As illustrated in FIG. 13, the second engaged portion 21 includes the second recesses 23 at a plurality of locations in the circumferential direction C. The second engaged portion 21 includes an even number of the second recesses 23. The second recesses 23 are disposed at the second intervals D2 in the circumferential direction C.

In the present example, the fourth intervals D4 are equal to the fourth intervals D4 in the above embodiment, and the fifth intervals D5 are equal to the fifth intervals D5 in the above embodiment. Also in the present example, the first intervals D1 are equal to the second intervals D2. The first intervals D1 and the second intervals D2, however, are half of the fourth intervals D4. The third intervals D3 are equal to the fourth intervals D4. In the present example, the third intervals D3 are each longer than any of the first intervals D1 and the second intervals D2 unlike the above embodiment. Specifically, the third intervals D3 are twice as long as the first intervals D1 and twice as long as the second intervals D2.

As illustrated in FIG. 11, all of the protrusive ridges 32 included in the engagement portion 31 are formed to have identical shapes. As illustrated in FIG. 12, the first recesses 13 include: first normal recesses 13*a* each having a shape engageable with the associated protrusive ridge 32; and first particular recesses 13*b* each having a shape non-engageable with the associated protrusive ridge 32. The first particular recesses 13*b* are smaller in at least either width in the circumferential direction C or depth in the radial direction R than the first normal recesses 13*a* and are thus formed to be non-engageable with the protrusive ridges 32. In the present example, the first particular recesses 13*b* are formed so as to be smaller in depth in the radial direction R than the first normal recesses 13*a*. As illustrated in FIG. 13, the second recesses 23 include: second normal recesses 23*a* each having a shape engageable with the associated protrusive ridge 32; and second particular recesses 23*b* each having a shape non-engageable with the associated protrusive ridge 32. The second particular recesses 23*b* are smaller in at least either width in the circumferential direction C or depth in the radial direction R than the second normal recesses 23*a* and are thus formed to be non-engageable with the protrusive ridges 32. In the present example, the second particular recesses 23*b* are formed so as to be smaller in depth in the radial direction R than the second normal recesses 23*a*.

At least one first particular recess 13*b* is included in the first recesses 13. In the present embodiment, more than one first particular recess 13*b* is included in the first recesses 13. When more than one first particular recess 13*b* is included in the first recesses 13 as just described, the first particular recesses 13*b* are provided at intervals, the lengths of which are even multiples of the lengths of the first intervals D1, in the circumferential direction C. In the example illustrated in FIG. 12, the number of first particular recesses 13*b* is four in total, and the four first particular recesses 13*b* are provided at intervals six times longer than the first intervals D1 in the circumferential direction C. At least one second particular recess 23*b* is included in the second recesses 23. In the present embodiment, more than one second particular recess 23*b* is included in the second recesses 23. When more than one second particular recess 23*b* is included in the second recesses 23 as just described, the second particular recesses 23*b* are provided at intervals, the lengths of which are even multiples of the lengths of the second intervals D2, in the circumferential direction C. In the example illustrated in FIG. 13, the number of second particular recesses 23*b* is four in total, and the four second particular recesses 23*b* are provided at intervals six times longer than the second intervals D2 in the circumferential direction C.

Figure 14:
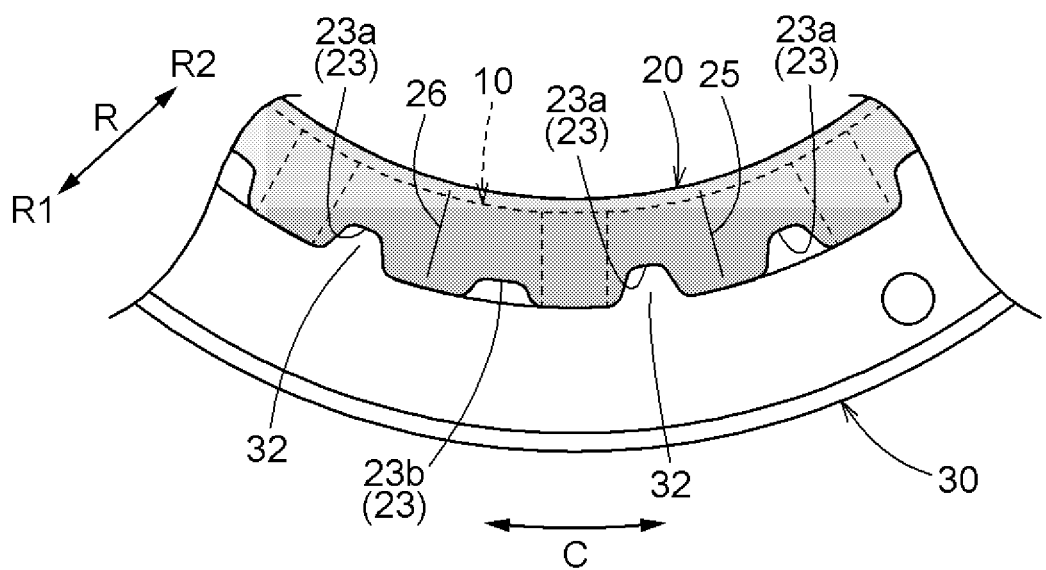
FIG. 14 is a diagram illustrating a state where the piston and the elastic member according to the alternative embodiment are assembled to the first support member.

The engagement portion 31, the first engaged portion 11, and the second engaged portion 21 are formed as described above. Thus, as partially illustrated in FIG. 14, the piston 10 is able to be brought into engagement with the first support member 30 only at a phase where all of the protrusive ridges 32 are disposed at positions corresponding to those of the first normal recesses 13*a* in the circumferential direction C, and the elastic member 20 is able to be brought into engagement with the first support member 30 only at a phase where all of the protrusive ridges 32 are disposed at positions corresponding to those of the second normal recesses 23*a* in the circumferential direction C. To facilitate understanding, the elastic member 20 illustrated in FIG. 14 is highlighted by hatching. The piston 10 and the elastic member 20 are able to be brought into engagement with the first support member 30 only at the phase illustrated in FIG. 14, i.e., only at the suitable phase where the pressers 14*a* and the projections 25 are located at corresponding positions in the circumferential direction C.

Rotating the elastic member 20 by an angle equivalent to each second interval D2 from the state illustrated in FIG. 14 causes the piston 10 and the elastic member 20 to be disposed at the particular phase where the radial grooves 14*b* and the projections 25 are located at corresponding positions in the circumferential direction C. In this case, however, the protrusive ridges 32 are disposed at positions corresponding to those of the second particular recesses 23*b* in the circumferential direction C, making it impossible to bring the elastic member 20 into engagement with the first support member 30. Rotating the piston 10 by an angle equivalent to each first interval D1 from the state illustrated in FIG. 14 also causes the piston 10 and the elastic member 20 to be disposed at the particular phase. In this case, however, the protrusive ridges 32 are disposed at positions corresponding to those of the first particular recesses 13*b* in the circumferential direction C, making it impossible to bring the piston 10 into engagement with the first support member 30. As just described, at the particular phase, the protrusive ridges 32 are disposed at positions corresponding to those of at least either the first particular recesses 13*b* or the second particular recesses 23*b* (i.e., either the first particular recesses 13*b* or the second particular recesses 23*b* in the present example) in the circumferential direction C. Accordingly, the piston 10 and the elastic member 20 are unable to be brought into engagement with the first support member 30 at the particular phase.

(2) The above embodiment has illustrated, by way of example, the structure in which the first support member 30, serving as the tubular member, is disposed on the radially outer side R1 relative to the first friction plates 51, each serving as the friction plate, so as to support the first friction plates 51. The present disclosure, however, is not limited to such a structure. An alternative embodiment may provide a structure in which the first support member 30 is disposed on the radially inner side R2 relative to the first friction plates 51 so as to support the first friction plates 51, and the first support member 30 includes, on its outer peripheral surface (which is the peripheral surface 30*a*), the engagement portion 31. In this case, the radially inner side R2 corresponds to the "first radial side", and the radially outer side R1 corresponds to the "second radial side".

(3) The above embodiment has illustrated, by way of example, the structure in which the supply oil passages 90

(through which oil that has passed through the radial grooves 14b is supplied to the rotary electric machine MG) are defined outward of the piston 10 in the radial direction R. The present disclosure, however, is not limited to such a structure. An alternative embodiment may provide a structure in which no such supply oil passages 90 are defined outward of the piston 10 in the radial direction R. In other words, an alternative embodiment may provide a structure in which oil that has passed through the radial grooves 14b is not supplied to the rotary electric machine MG.

(4) The above embodiment has illustrated, by way of example, the structure in which the first engagement device 1 is disposed inward of the rotary electric machine MG in the radial direction R so as to be coaxial with the rotary electric machine MG. The present disclosure, however, is not limited to such a structure. An alternative embodiment may provide a structure in which the first engagement device 1 is disposed side by side with the rotary electric machine MG in the axial direction L or a structure in which the first engagement device 1 and the rotary electric machine MG are disposed on different axes.

(5) The above embodiment has illustrated, by way of example, the structure in which the friction engagement device according to the present disclosure (which is the first engagement device 1 in the above embodiment) is provided in the vehicle drive apparatus 100 including the rotary electric machine MG in a power transmission path through which the input member A1 drivingly connected to the internal combustion engine E is connected to the output member A2 drivingly connected to the wheels W, such that the friction engagement device is disposed in the power transmission path between the input member A1 and the rotary electric machine MG. The present disclosure, however, is not limited to such a structure. The friction engagement device according to the present disclosure may be disposed in a portion of the vehicle drive apparatus 100 other than the power transmission path between the input member A1 and the rotary electric machine MG. The friction engagement device according to the present disclosure may be disposed in an apparatus for driving a vehicle different in structure from the vehicle drive apparatus 100 (e.g., an apparatus for driving a vehicle including either one of the internal combustion engine E and the rotary electric machine MG serving as a driving force source for the wheels W).

(6) The structure(s) disclosed in each of the above-described embodiments may be combined with structure(s) disclosed in other embodiment(s) for application, as long as no contradiction arises. The present disclosure includes any combination of the alternative embodiments described above. Other structures of the embodiments disclosed herein are only illustrative in all respects. Accordingly, various changes may be made as appropriate without departing from the spirit of the present disclosure.

Summary of Above Embodiments

A summary of the friction engagement device described above will be given below.

A friction engagement device (1) includes: a friction plate (51); a tubular member (30) supporting the friction plate (51); and a piston (10) to press the friction plate (51) from a first axial side (L1) that is one side in an axial direction (L). The tubular member (30) has a tubular shape extending in the axial direction (L) and is disposed on a first radial side (R1) that is an outer side or an inner side in a radial direction (R) relative to the friction plate (51). The tubular member (30) includes an engagement portion (31) on a peripheral surface (30a) of the tubular member (30) located on a second radial side (R2) opposite to the first radial side (R1) in the radial direction (R). The engagement portion (31) includes at least either a protrusive ridge or protrusive ridges (32) protruding to the second radial side (R2) and extending in the axial direction (L) or a recessed groove or recessed grooves (33) recessed to the first radial side (R1) and extending in the axial direction (L). The piston (10) includes a first engaged portion (11) to be brought into engagement with the engagement portion (31) so as to be movable in the axial direction (L), and a pressing surface (14) formed to face a second axial side (L2) opposite to the first axial side (L1) in the axial direction (L) so as to press the friction plate (51). The pressing surface (14) is provided with a radial groove (14b) recessed to the first axial side (L1) and extending in the radial direction (R). The friction engagement device (1) further includes an elastic member (20) disposed between the piston (10) and the friction plate (51) in the axial direction (L) so as to be elastically deformed by a pressing force of the piston (10). The elastic member (20) includes a second engaged portion (21) to be brought into engagement with the engagement portion (31) so as to be movable in the axial direction (L), and an annular plate portion (24) sandwiched between the pressing surface (14) and the friction plate (51) from both sides in the axial direction (L). A surface of the annular plate portion (24) facing the first axial side (L1) is provided with a projection (25) protruding to the first axial side (L1) and a recess (26) recessed to the second axial side (L2), such that the projection (25) and the recess (26) are arranged alternately in a circumferential direction (C). Assuming that a phase where the radial groove (14b) and the projection (25) are located at corresponding positions in the circumferential direction (C) is a particular phase, the engagement portion (31), the first engaged portion (11), and the second engaged portion (21) are formed such that the piston (10) and the elastic member (20) are unable to come into engagement with the tubular member (30) at the particular phase.

In this structure, the elastic member (20) to be elastically deformed by the pressing force of the piston (10) is provided between the piston (10) and the friction plate (51) in the axial direction (L). Thus, an engagement shock resulting from engagement of the friction engagement device (1) is absorbable by elastic deformation of the elastic member (20) to a greater degree than when no such elastic member (20) is provided and the piston (10) directly presses the friction plate (51).

The above structure involves using the elastic member (20) including the annular plate portion (24) provided with the projection (25) and the recess (26) arranged alternately in the circumferential direction (C). In the above structure, the pressing surface (14) of the piston (10) is provided with the radial groove (14b). In such a structure, if the piston (10) presses the friction plate (51), with the radial groove (14b) of the pressing surface (14) and the projection (25) of the elastic member (20) disposed at corresponding positions in the circumferential direction (C), the elastic member (20) may not undergo suitable elastic deformation in accordance with movement of the piston (10) to the second axial side (L2) depending on the shape and/or size of the radial groove (14b). This may make it impossible to achieve the effect of absorbing the engagement shock of the friction engagement device (1) as designed.

In this respect, assuming that the phase where the radial groove (14b) and the projection (25) are located at corresponding positions in the circumferential direction (C) is the particular phase, the above structure involves forming the engagement portion (31), the first engaged portion (11), and the second engaged portion (21) such that the piston (10) and the elastic member (20) are unable to come into engagement with the tubular member (30) at the particular phase. Thus, the piston (10) and the elastic member (20) easily avoid being assembled at the particular phase during assembly of the piston (10) and the elastic member (20) to the tubular member (30). This facilitates suitably achieving the engagement shock absorbing effect.

As described thus far, the above structure is able to suitably absorb the engagement shock when the friction engagement device (1) includes the piston (10) whose pressing surface (14) is provided with the radial groove (14b).

The engagement portion (31) preferably includes the recessed grooves (33) at a plurality of locations in the circumferential direction (C). The first engaged portion (11) preferably includes, at a plurality of locations in the circumferential direction (C), first projections (12) protruding to the first radial side (R1) from a peripheral edge of the piston (10) on the first radial side (R1). The second engaged portion (21) preferably includes, at a plurality of locations in the circumferential direction (C), second projections (22) protruding to the first radial side (R1) from a peripheral edge of the elastic member (20) on the first radial side (R1). The recessed grooves (33) preferably include a normal recessed groove (33a) having a shape engageable with any of the first projections (12) and the second projections (22), and a particular recessed groove (33b) having a shape non-engageable with any of the first projections (12) and the second projections (22). At the particular phase, at least one of the first projections (12) and the second projections (22) is preferably disposed at a position corresponding to that of the particular recessed groove (33b) in the circumferential direction (C).

When the engagement portion (31) includes the recessed grooves (33) at a plurality of locations in the circumferential direction (C), this structure enables the engagement portion (31), the first engaged portion (11), and the second engaged portion (21) to be formed suitably such that the piston (10) and the elastic member (20) are unable to come into engagement with the tubular member (30) at the particular phase.

In the structure in which the engagement portion (31) includes the recessed grooves (33) at a plurality of locations in the circumferential direction (C), the first engaged portion (11) includes the first projections (12) at a plurality of locations in the circumferential direction (C), and the second engaged portion (21) includes the second projections (22) at a plurality of locations in the circumferential direction (C) as described above, the first projections (12) are preferably disposed at a first interval (D1) in the circumferential direction (C), the second projections (22) are preferably disposed at a second interval (D2) in the circumferential direction (C), the recessed grooves (33) are preferably disposed at a third interval (D3) in the circumferential direction (C), and the third interval (D3) is preferably shorter than any of the first interval (D1) and the second interval (D2).

If the recessed grooves (33) include no particular recessed groove (33b) when the third interval (D3) is shorter than any of the first interval (D1) and the second interval (D2) as mentioned above, the piston (10) and the elastic member (20) may be assembled at the particular phase during assembly of the piston (10) and the elastic member (20) to the tubular member (30). In this respect, the present disclosure provides the structure in which at least one of the first projections (12) and the second projections (22) is disposed at a position corresponding to that of the particular recessed groove (33b) in the circumferential direction (C) at the particular phase as described above. Consequently, the piston (10) and the elastic member (20) would easily avoid being assembled at the particular phase if the third interval (D3) is shorter than any of the first interval (D1) and the second interval (D2).

The engagement portion (31) preferably includes the protrusive ridges (32) at a plurality of locations in the circumferential direction (C). The first engaged portion (11) preferably includes, at a plurality of locations in the circumferential direction (C), first recesses (13) recessed to the second radial side (R2) from a peripheral edge of the piston (10) on the first radial side (R1). The second engaged portion (21) preferably includes, at a plurality of locations in the circumferential direction (C), second recesses (23) recessed to the second radial side (R2) from a peripheral edge of the elastic member (20) on the first radial side (R1). The first recesses (13) preferably include a first normal recess (13a) having a shape engageable with the protrusive ridge (32), and a first particular recess (13b) having a shape non-engageable with the protrusive ridge (32). The second recesses (23) preferably include a second normal recess (23a) having a shape engageable with the protrusive ridge (32), and a second particular recess (23b) having a shape non-engageable with the protrusive ridge (32). At the particular phase, at least one of the first particular recess (13b) and the second particular recess (23b) is preferably disposed at a position corresponding to that of the protrusive ridge (32) in the circumferential direction (C).

When the engagement portion (31) includes the protrusive ridges (32) at a plurality of locations in the circumferential direction (C), this structure enables the engagement portion (31), the first engaged portion (11), and the second engaged portion (21) to be formed suitably such that the piston (10) and the elastic member (20) are unable to come into engagement with the tubular member (30) at the particular phase.

In the structure in which the engagement portion (31) includes the protrusive ridges (32) at a plurality of locations in the circumferential direction (C), the first engaged portion (11) includes the first recesses (13) at a plurality of locations in the circumferential direction (C), and the second engaged portion (21) includes the second recesses (23) at a plurality of locations in the circumferential direction (C) as described above, the first recesses (13) are preferably disposed at a first interval (D1) in the circumferential direction (C), the second recesses (23) are preferably disposed at a second interval (D2) in the circumferential direction (C), the protrusive ridges (32) are preferably disposed at a third interval (D3) in the circumferential direction (C), and the third interval (D3) is preferably longer than any of the first interval (D1) and the second interval (D2).

If the first recesses (13) include no first particular recess (13b) or if the second recesses (23) include no second particular recess (23b) when the third interval (D3) is longer than any of the first interval (D1) and the second interval (D2) as mentioned above, the piston (10) and the elastic member (20) may be assembled at the particular phase during assembly of the piston (10) and the elastic member (20) to the tubular member (30). In this respect, the present disclosure provides the structure in which the protrusive ridge (32) is disposed at a position corresponding to that of at least one of the first particular recess (13b) and the second particular recess (23b) in the circumferential direction (C) at the particular phase as described above. Consequently, the piston (10) and the elastic member (20) would easily avoid being assembled at the particular phase if the third interval (D3) is longer than any of the first interval (D1) and the second interval (D2).

The friction engagement device (1) having any of the above structures is preferably provided in a vehicle drive apparatus (100) including a rotary electric machine (MG) in a power transmission path through which an input member (A1) drivingly connected to an internal combustion engine (E) is connected to an output member (A2) drivingly connected to a wheel (W), such that the friction engagement device (1) is disposed in the power transmission path between the input member (A1) and the rotary electric machine (MG).

When the friction engagement device (1) is disposed in the power transmission path between the input member (A1) and the rotary electric machine (MG) as described above, the friction engagement device (1) in a released state is engaged, for example, upon starting the internal combustion engine (E) by rotationally driving the output member of the internal combustion engine (E) in accordance with torque of the rotary electric machine (MG). In this case, a sudden increase in torque of the internal combustion engine (E) may be transmitted to the wheel (W) through the friction engagement device (1), resulting in a change in vehicle behavior. In this respect, the friction engagement device (1) according to the present disclosure is provided with the elastic member (20) between the piston (10) and the friction plate (51) in the axial direction (L), thus making it possible to minimize such a change in vehicle behavior. Consequently, the friction engagement device (1) according to the present disclosure is particularly suitable for being disposed in the power transmission path between the input member (A1) and the rotary electric machine (MG).

The friction engagement device (1) is preferably disposed inward of the rotary electric machine (MG) in the radial direction (R) so as to be coaxial with the rotary electric machine (MG). A supply oil passage (90) through which oil that has passed through the radial groove (14b) is supplied to the rotary electric machine (MG) is preferably defined outward of the piston (10) in the radial direction (R).

When oil is supplied to the friction plate (51) from the inner side in the radial direction (R), this structure is able to supply oil, which has passed through the radial groove (14b), to the rotary electric machine (MG) so as to cool the rotary electric machine (MG). If the piston (10) is pressing the friction plate (51), oil would be suppliable to the rotary electric machine (MG) through the radial groove (14b) as just described. Accordingly, cooling oil is suppliable to the rotary electric machine (MG) irrespective of the engagement state of the friction engagement device (1).

The friction engagement device according to the present disclosure is preferably able to achieve at least one of the effects described above.

DESCRIPTION OF THE REFERENCE NUMERALS 1 first engagement device (friction engagement device)
10 piston
11 first engaged portion
12 first projection
13 first recess
13a first normal recess
13b first particular recess
14 pressing surface
14b radial groove
20 elastic member
21 second engaged portion
22 second projection
23 second recess
23a second normal recess
23b second particular recess
24 annular plate portion
25 projection
26 recess
30 first support member (tubular member)
30a peripheral surface
31 engagement portion
32 protrusive ridge
33 recessed groove
33a normal recessed groove
33b particular recessed groove
51 first friction plate (friction plate)
90 supply oil passage
100 vehicle drive apparatus
A1 input member
A2 output member
C circumferential direction
D1 first interval
D2 second interval
D3 third interval
E internal combustion engine
L axial direction
L1 first axial side
L2 second axial side
MG rotary electric machine
R radial direction
R1 radially outer side (first radial side)
R2 radially inner side (second radial side)
W wheel

The invention claimed is:

1. A friction engagement device comprising:
a friction plate;
a tubular member supporting the friction plate; and
a piston to press the friction plate from a first axial side that is one side in an axial direction, wherein
the tubular member has a tubular shape extending in the axial direction and is disposed on a first radial side that is an outer side or an inner side in a radial direction relative to the friction plate,
the tubular member includes an engagement portion on a peripheral surface of the tubular member located on a second radial side opposite to the first radial side in the radial direction,
the engagement portion includes at least either a protrusive ridge or protrusive ridges protruding to the second radial side and extending in the axial direction or a recessed groove or recessed grooves recessed to the first radial side and extending in the axial direction,
the piston includes a first engaged portion to be brought into engagement with the engagement portion so as to be movable in the axial direction, and a pressing surface formed to face a second axial side opposite to the first axial side in the axial direction so as to press the friction plate,
the pressing surface is provided with a radial groove recessed to the first axial side and extending in the radial direction,
the friction engagement device further comprises an elastic member disposed between the piston and the friction plate in the axial direction so as to be elastically deformed by a pressing force of the piston,
the elastic member includes a second engaged portion to be brought into engagement with the engagement portion so as to be movable in the axial direction, and an annular plate portion sandwiched between the pressing surface and the friction plate from both sides in the axial direction, a surface of the annular plate portion facing the first axial side is provided with a projection protruding to the first axial side and a recess recessed to the second axial side, such that the projection and the recess are arranged alternately in a circumferential direction, and assuming that a phase where the radial groove and the projection are located at corresponding positions in the circumferential direction is a particular phase, the engagement portion, the first engaged portion, and the second engaged portion are formed such that either one of the piston and the elastic member is unable to come into engagement with the tubular member at the particular phase.

2. The friction engagement device according to claim 1, wherein the engagement portion includes the recessed grooves at a plurality of locations in the circumferential direction, the first engaged portion includes, at a plurality of locations in the circumferential direction, first projections protruding to the first radial side from a peripheral edge of the piston on the first radial side, the second engaged portion includes, at a plurality of locations in the circumferential direction, second projections protruding to the first radial side from a peripheral edge of the elastic member on the first radial side, the recessed grooves include a normal recessed groove having a shape engageable with any of the first projections and the second projections, and a particular recessed groove having a shape non-engageable with any of the first projections and the second projections, and at the particular phase, at least one of the first projections and the second projections is disposed at a position corresponding to that of the particular recessed groove in the circumferential direction.

3. The friction engagement device according to claim 2, wherein the first projections are disposed at a first interval in the circumferential direction, the second projections are disposed at a second interval in the circumferential direction, the recessed grooves are disposed at a third interval in the circumferential direction, and the third interval is shorter than any of the first interval and the second interval.

4. The friction engagement device according to claim 3, wherein the friction engagement device is provided in a vehicle drive apparatus including a rotary electric machine in a power transmission path through which an input member drivingly connected to an internal combustion engine is connected to an output member drivingly connected to a wheel, such that the friction engagement device is disposed in the power transmission path between the input member and the rotary electric machine.

5. The friction engagement device according to claim 4, wherein the friction engagement device is disposed inward of the rotary electric machine in the radial direction so as to be coaxial with the rotary electric machine, and a supply oil passage through which oil that has passed through the radial groove is supplied to the rotary electric machine is defined outward of the piston in the radial direction.

6. The friction engagement device according to claim 2, wherein the friction engagement device is provided in a vehicle drive apparatus including a rotary electric machine in a power transmission path through which an input member drivingly connected to an internal combustion engine is connected to an output member drivingly connected to a wheel, such that the friction engagement device is disposed in the power transmission path between the input member and the rotary electric machine.

7. The friction engagement device according to claim 6, wherein the friction engagement device is disposed inward of the rotary electric machine in the radial direction so as to be coaxial with the rotary electric machine, and a supply oil passage through which oil that has passed through the radial groove is supplied to the rotary electric machine is defined outward of the piston in the radial direction.

8. The friction engagement device according to claim 1, wherein the engagement portion includes the protrusive ridges at a plurality of locations in the circumferential direction, the first engaged portion includes, at a plurality of locations in the circumferential direction, first recesses recessed to the second radial side from a peripheral edge of the piston on the first radial side, the second engaged portion includes, at a plurality of locations in the circumferential direction, second recesses recessed to the second radial side from a peripheral edge of the elastic member on the first radial side, the first recesses include a first normal recess having a shape engageable with the protrusive ridge, and a first particular recess having a shape non-engageable with the protrusive ridge, and the second recesses include a second normal recess having a shape engageable with the protrusive ridge, and a second particular recess having a shape non-engageable with the protrusive ridge, and at the particular phase, the protrusive ridge is disposed at a position corresponding to that of at least one of the first particular recess and the second particular recess in the circumferential direction.

9. The friction engagement device according to claim 8, wherein the first recesses are disposed at a first interval in the circumferential direction, the second recesses are disposed at a second interval in the circumferential direction, the protrusive ridges are disposed at a third interval in the circumferential direction, and the third interval is longer than any of the first interval and the second interval.

10. The friction engagement device according to claim 9, wherein the friction engagement device is provided in a vehicle drive apparatus including a rotary electric machine in a power transmission path through which an input member drivingly connected to an internal combustion engine is connected to an output member drivingly connected to a wheel, such that the friction engagement device is disposed in the power transmission path between the input member and the rotary electric machine.

11. The friction engagement device according to claim 10, wherein
the friction engagement device is disposed inward of the rotary electric machine in the radial direction so as to be coaxial with the rotary electric machine, and
a supply oil passage through which oil that has passed through the radial groove is supplied to the rotary electric machine is defined outward of the piston in the radial direction.

12. The friction engagement device according to claim 8, wherein
the friction engagement device is provided in a vehicle drive apparatus including a rotary electric machine in a power transmission path through which an input member drivingly connected to an internal combustion engine is connected to an output member drivingly connected to a wheel, such that the friction engagement device is disposed in the power transmission path between the input member and the rotary electric machine.

13. The friction engagement device according to claim 12, wherein
the friction engagement device is disposed inward of the rotary electric machine in the radial direction so as to be coaxial with the rotary electric machine, and
a supply oil passage through which oil that has passed through the radial groove is supplied to the rotary electric machine is defined outward of the piston in the radial direction.

14. The friction engagement device according claim 1, wherein
the friction engagement device is provided in a vehicle drive apparatus including a rotary electric machine in a power transmission path through which an input member drivingly connected to an internal combustion engine is connected to an output member drivingly connected to a wheel, such that the friction engagement device is disposed in the power transmission path between the input member and the rotary electric machine.

15. The friction engagement device according to claim 14, wherein
the friction engagement device is disposed inward of the rotary electric machine in the radial direction so as to be coaxial with the rotary electric machine, and
a supply oil passage through which oil that has passed through the radial groove is supplied to the rotary electric machine is defined outward of the piston in the radial direction.

* * * * *